United States Patent

Shibata et al.

Patent Number: 5,260,834
Date of Patent: Nov. 9, 1993

[54] SMALL ZOOM LENS SYSTEM

[75] Inventors: Hironori Shibata; Shinichi Mihara, both of Tokyo, Japan

[73] Assignee: Olympus Optical Co., Ltd., Tokyo, Japan

[21] Appl. No.: 862,427

[22] Filed: Apr. 2, 1992

[30] Foreign Application Priority Data

Apr. 5, 1991 [JP] Japan ................................ 3-073092
Apr. 17, 1991 [JP] Japan ................................ 3-084968

[51] Int. Cl.$^5$ .............................................. G02B 15/14
[52] U.S. Cl. ...................................... 359/690; 359/686
[58] Field of Search ................. 359/690, 687, 689, 686

[56] References Cited

U.S. PATENT DOCUMENTS 4,582,399  4/1986  Mihara ................................ 359/687
4,906,079  3/1990  Mihara et al. ...................... 359/687

FOREIGN PATENT DOCUMENTS 63-287810  11/1988  Japan.
64-91110   4/1989   Japan.
64-74519   8/1989   Japan.
2-291515   12/1990  Japan.

Primary Examiner—Scott J. Sugarman
Attorney, Agent, or Firm—Cushman, Darby & Cushman

[57] ABSTRACT

The present invention relates to a small zoom lens system for electronic still cameras or video cameras, which has a zoom ratio lying in the range of about 2.5-3.2 and an F-number lying in the range of about 2-2.8, comprises as small as 7 or 8 lenses and is reduced in terms of both the total length and the lens diameter, and which is characterized by comprising, in order from the object side, at least a first lens group having a positive refractive power, a second lens group having a negative refractive power, a stop and a third lens group having a positive refractive power, and in that during zooming the first lens group remains fixed while the second and third lens groups are moved along the optical axis, and the following conditions (1) and (2) are satisfied:

$$0.9 \times \beta_{2T}/\beta_{2W} < \beta_{3T}/\beta_{3W} < 2.0 \times \beta_{2T}/\beta_{2W}, \quad (1),$$

and $$0.5 < f_3/|f_2| < 1.5, \quad (2)$$

where
$\beta_{2T}$ is the magnification of the second lens group at the telephoto end,
$\beta_{2W}$ is the magnification of the second lens group at the wide angle end,
$\beta_{3T}$ is the magnification of the third lens group at the telephoto end,
$\beta_{3W}$ is the magnification of the third lens group at the wide angle end,
$f_2$ is the focal length of the second lens group, and
$f_3$ is the focal length of the third lens group.

13 Claims, 14 Drawing Sheets

SMALL ZOOM LENS SYSTEM

BACKGROUND OF THE INVENTION

The present invention relates to a zoom lens system and, more particularly, to a small zoom lens system lending itself well fit for electronic still cameras or video cameras using solid-state image sensors as image pickup devices.

With recent rapid reductions in the weight and cost of video cameras, there is an increased demand toward reducing the size and weight of their lens systems.

So far, this object has been achieved by arranging second and third lens groups with a stop between them and moving the second and third lens groups in the directions to increase their magnifications, as typically set forth in Japanese Provisional Patent Publication No. Hei. 2-291515 which is directed to the same type of zoom lens system as described in the present disclosure.

However, the above conventional system uses as many as 11-12 lenses and so is still far from satisfactory in terms of the front lens diameter.

SUMMARY OF THE INVENTION

In view of such situations as mentioned above, a major object of this invention is to eliminate the above defect of the prior art by providing a small zoom lens system for electronic still cameras or video cameras which has a zoom ratio of about 2.5-3.2 and an F-number of about 2-2.8, comprises as small as 7-8 lenses and is reduced in terms of both the total length and the lens diameter.

In order to reduce the total length and lens diameter of the lens system as well as the diameter of the front lens that is larger than those of other lens groups, the zoom lens system according to this invention is characterized by comprising, in order from the object side, at least a first lens group having a positive refractive power, a second lens group having a negative refractive power, a stop and a third lens group having a positive refractive power, and in that during zooming the first lens group remains fixed while the second and third lens groups are moved along the optical axis, and the following conditions (1) and (2) are satisfied:

$$0.9 \times \beta_{2T}/\beta_{2W} < \beta_{3T}/\beta_{3W} < 2.0 \times \beta_{2T}/\beta_{2W}, \quad (1)$$

and $$0.5 < f_3/|f_2| < 1.5. \quad (2)$$

Here
- $\beta_{2T}$ is the magnification of the second lens group at the telephoto end,
- $\beta_{2W}$ is the magnification of the second lens group at the wide angle end,
- $\beta_{3T}$ is the magnification of the third lens group at the telephoto end,
- $\beta_{3W}$ is the magnification of the third lens group at the wide angle end,
- $f_2$ is the focal length of the second lens group, and
- $f_3$ is the focal length of the third lens group.

Another embodiment of this invention designed to provide a solution to the above problem is characterized by comprising, in order from the object side, a first lens group having a positive refractive power, a second lens group having a negative refractive power, a stop and a third lens group having a positive refractive power, and in that during zooming the first lens group remains fixed while the second and third lens groups are moved along the optical axis and the following conditions (3) and (4) are satisfied:

$$-5 < (r_{31F} + r_{31R})/(r_{31F} - r_{31R}) < 1, \quad (3),$$

and $$1.2 < (r_{32F} + r_{32R})/(r_{32F} - r_{32R}) < 4. \quad (4)$$

Here
- $r_{31F}$ is the radius of curvature on the object side of the first lens of the third lens group,
- $r_{31R}$ is the radius of curvature on the image side of the first lens of the third lens group,
- $r_{32F}$ is the radius of curvature on the object side of the second lens of the third lens group, and
- $r_{32R}$ is the radius of curvature on the image side of the second lens of the third lens group.

In these zoom lens systems, an additional fourth lens group, which remains fixed during zooming, may be provided on the image side of the third lens group. It is desired that the stop remain fixed during zooming, and it is also desired that the second and third lens groups be moved in the opposite directions along the optical axis during zooming.

In the zoom lens systems of this invention, the first and second lens groups may be made up of at most four lenses in all and the third lens group may be constructed from three lenses, say, a positive lens, a negative lens and a positive lens.

More preferably, the zoom lens systems of this invention should conform to the following condition (5):

$$0.2 < r_{32R}/r_{33F} < 1.5. \quad (5)$$

Here
- $r_{32R}$ is the radius of curvature on the image side of the second lens of the third lens group, and
- $r_{33F}$ is the radius of curvature on the object side of the third lens of the third lens group.

More preferably, the first embodiment of the zoom lens system of this invention should conform to the following condition:

$$-5 < (r_{31F} + r_{31R})/(r_{31F} - r_{31R}) < 1, \quad (3)$$

Here
- $r_{31F}$ is the radius of curvature on the object side of the first lens of the third lens group, and
- $r_{31R}$ is the radius of curvature on the image side of the first lens of the third lens group, In the zoom lens systems of this invention, it is more preferred that the surface of the first lens of the third lens group proximate to the image side be in aspherical configuration and the following condition (6) be met:

$$0.5 \times 10^{-3} < |\Delta x|/\{(f_W \cdot f_T)^{\frac{1}{2}} F_{NO}^{3}\} < 0.8 \times 10^{-2} (\Delta x < 0). \quad (6)$$

Here
- $f_W$ is the focal length of the total system at the wide angle end,
- $f_T$ is the focal length of the total system at the telephoto end
- $\Delta x$ is the axial displacement of the aspherical surface with respect to the spherical suface with the focal length being identical with that of the first lens of the third lens group, and $F_{NO}$ is the smallest F-number of the total system at the wide angle end.

More preferably, the zoom lens systems of this invention should conform to the following condition (7):

$$0.3 < D_{III}/(f_W \cdot f_T)^{\frac{1}{2}} < 0.8. \qquad (7)$$

Here $f_W$ is the focal length of the total system at the wide angle end, $f_T$ is the focal length of the total system at the telephoto end, and $D_{III}$ is the distance from the vertex of the surface of the third lens group proximate to the object side to the vertex of the surface thereof proximate to the image side.

A further embodiment of the zoom lens system of this invention comprises, in order from the object side, at least a first lens group having a positive refractive power, a second lens group having a negative refractive power and a third lens group having a positive refractive power, wherein the first and second lens groups are made up of at most four lenses in all and the third lens group is constructed from a first positive lens, a second negative meniscus lens and a third positive lens, and during zooming the first lens group remains fixed while the second and third lens groups are moved along the optical axis.

In this embodiment, the first lens of the first lens group may be a negative meniscus lens convex on the object side and an additional fourth lens group having a reduced refractive power may be located on the image side of the third lens group.

Reference will now be made to what is implied by each of the above-described conditions.

In view of space efficiency and in order to reduce the total length of the zoom lens system, it is preferred to use an optical system in which the second and third lens groups are moved from the wide angle to the telephoto end in the direction to allow their magnifications to be increased simultaneously. In order to achieve a lens diameter reduction at the same time, the stop is located between the second and third lens groups. If the stop is located in the rear of the third lens group, the front lens would then be likely to increase in diameter, and if located in front of the second lens group, the rear lens would then be likely to increase in diameter. By permitting the first lens group to remain fixed during zooming, it is possible to prevent the front lens diameter from increasing, thereby assuring the quantity of marginal rays.

By making use of the above optical system while conforming to Conditions (1) and (2), the zoom lens system of this invention is further reduced in terms of the whole lens diameter. Condition (1) is directed to the proportion of the zoom ratio of the second lens group with respect to that of the third lens group. Thus, the entrance pupil can be positioned at a shallow location by making the zoom ratio of the second lens group smaller than conventional; that is, it is possible to reduce the front lens diameter. Exceeding the upper limit of Condition (1) is unpreferred, because the quantity of movement of the third lens group is so increased that the ray incident on the third lens group at the wide angle end goes too high, resulting in an increase in the diameter(s) of the lens group(s) located after the stop. Falling short of the lower limit, on the contrary, would render it impossible to reduce the front lens diameter. A zoom lens system having a much more reduced front lens diameter can be achieved by setting the lower limit value in the range defined by the following condition (1'):

$$1.0 \times \beta_{2T}/\beta_{2W} < \beta_{3T}/\beta_{3W} < 2.0 \times \beta_{2T}/\beta_{2W}. \qquad (1')$$

The second condition (2) is directed to the ratio of the focal lengths of the second and third lens groups, and determines a proper range of the lens diameter in connection with Condition (1). Exceeding the upper limit would cause the refractive power of the second lens group to be relatively stronger than those of the rest, so that with the same proportion of zoom ratio, the rear lens group or groups increases or increase in lens diameter. Falling short of the lower limit would again render it impossible to reduce the front lens diameter. By setting the upper limit value in the range defined by the following condition:

$$0.5 < f_3/|f_2| < 1.1, \qquad (2')$$

a further reduction in the lens diameter(s) of the rear lens group(s) is achieved, thus making it possible to construct a more compact zoom lens system.

When it is intended to reduce the size of an optical system using a solid-state image sensor or other element with a small effective image pickup area, the size of the associated lens system will be reduced in proportion to the above effective image pickup area. Indeed, however, there are some problems in connection with assuring the edge thickness of convex lenses or the intermediate thickness of concave lenses and lens processings. In other words, the smaller the effective image pickup area, the graver these problems become; to reduce the number of lenses as much as possible is preferred for making the lens system small. However, a reduction in the total length of the lens system results in an increase in the refractive power of each lens group. When each lens group is constructed with fewer lenses, this makes their radii of curvature likely to increase, rendering aberrations including chromatic aberration much worse.

According to this invention, the third lens group is comprised of three lenses positive, negative and positive in refractive power and allowed to conform to the above-described conditions (3) and (4) so as to obtain a lens system comprising fewer lenses, made small and well corrected for aberrations.

Concerning the shape factor ($sf_{31}$) of the first lens of the third lens group, Condition (3) is again provided especially for correcting positive astigmatism which increases with an increase in the curvature of the second lens of the third lens group. If $sf_{31}$ lies in the above-defined range, then an increased negative astigmatism can be produced with respect to a ray incident at a certain angle with the stop, even when the power is of the same order, thus making it possible to compensate for positive large astigmatism due to the second lens of the third lens group. However, exceeding the upper limit is unpreferred because the quantity of negative astigmatism produced is so decreased that the above-mentioned effect cannot be achieved. Falling short of the lower limit is again unpreferred because the curvature of the surface on the object side is so strong that the quantities of high-order aberrations produced are increased. Note that the range of $-1.0$ to $-0.1$ is more preferred because the performance of these aberrations is much more improved.

Condition (4) defines the shape factor ($sf_{32}$) of the negative lens of the third lens group. Exceeding the upper limit is undesired because the quantity of spherical aberration due to the third lens group becomes too large, and falling short of the lower limit is undesired as well, because the curvature of the meridional image surface becomes too large. By setting this lower limit at 1.5, as expressed by the following condition (4'):

$$1.5 < (r_{32F} + r_{32R})/(r_{32F} - r_{32R}) < 4 \qquad (4')$$

the curvature of field caused by the third lens group can be further reduced, thus making it possible to construt a zoom lens system well improved in terms of the performance of aberrations.

Referring then to the ratio of the image-side curvature of the second lens of the third lens group relative to the object-side curvature of the third lens, it is desired that the above-described condition (5) be satisfied so as to achieve reductions in the number and size of the lenses used and for aberration correction as well. In other words, the image-side curvature of the second lens that is only one negative lens in the third and fourth lens groups is likely to increase because it takes a large part in correcting negative Petzval's sum, distortion, etc. In order to compensate for high-order aberrations occuring there, it is desired that the radius of curvature be set in the range defined by the above-described condition (3). Exceeding the upper limit would cause the object-side curvature of the third lens to be too strong, resulting in overcorrection of negative Petzval's sum, etc., or making it difficult to assure the edge thickness of the third lens. Falling short of the lower limit, on the contrary, is unpreferred for the reason that high-order aberrations cannot be compensated for. By setting this lower limit at 0.4, as expressed by the following condition (5'):

$$0.4 < r_{32R}/r_{33F} < 1.5, \qquad (5')$$

higher-order aberrations can be well compensated for, thus making it possible to construct a zoom lens system much more improved in terms of the performance of aberrations.

It is also preferred that an aspherical surface be applied to the object-side surface of the first lens of the third lens group and the optical displacement $\Delta x$ from the spherical surface having the same radius of curvature as the paraxial radius of curvature satisfy the above-described condition (6). Falling short of the lower limit would lead to undercorrection of spherical aberration, whereas exceeding the upper limit would give rise to overcorrection of spherical aberration.

Further, it is desired that the total thickness of the third lens group conform to the above-described condition (7). This is because the third lens group must be as thin as possible in consideration of the zooming space allowed. Exceeding the upper limit would result in an increase in the total length or diameter of the third lens group itself, make the zooming space insufficient to assure the zoom ratio of the third lens group or lead to a power so increased that various aberrations such as spherical aberration, coma and astigmatism get worse. Falling short of the lower limit, on the other hand, would render it unable to assure the edge thickness of the positive lens.

Thus, the third lens group can be made up of as small as three lenses. Other lens groups may be made up of fewer lenses in consideration of chromatic and other aberrations; for instance, it is desired that the first lens group be comprised of two lenses, say, a lens having a negative refractive power and a lens having a positive refractive power, as viewed from the object side, and the second lens group be composed only of a negative lens or of two lenses, negative and positive. Although retrograde to the reduction in the number of the lenses to be used, an additional fourth lens group, which remains fixed during zooming, may be placed in the rear of the third lens group so as to minimize various aberrations. In this case, it is desired that the forth lens group have a positive refractive power.

In the embodiments of the zoom lens system of this invention, an aspherical surface whose positive refractive power decreases as it goes off center is further applied to the lens surface of any one of the 1st and 3rd lens groups, thus making correction of various aberrations far better.

Still other objects and advantages of the invention will in part be obvious and will in part be apparent from the specification.

The invention accordingly comprises the features of construction, combinations and elements, and arrangement of parts which will be exemplified in the construction hereinafter set forth, and the scope of the invention will be indicated in the claims.

DESCRIPTION OF THE PREFERRED EMBODIMENTS

Figure 1:
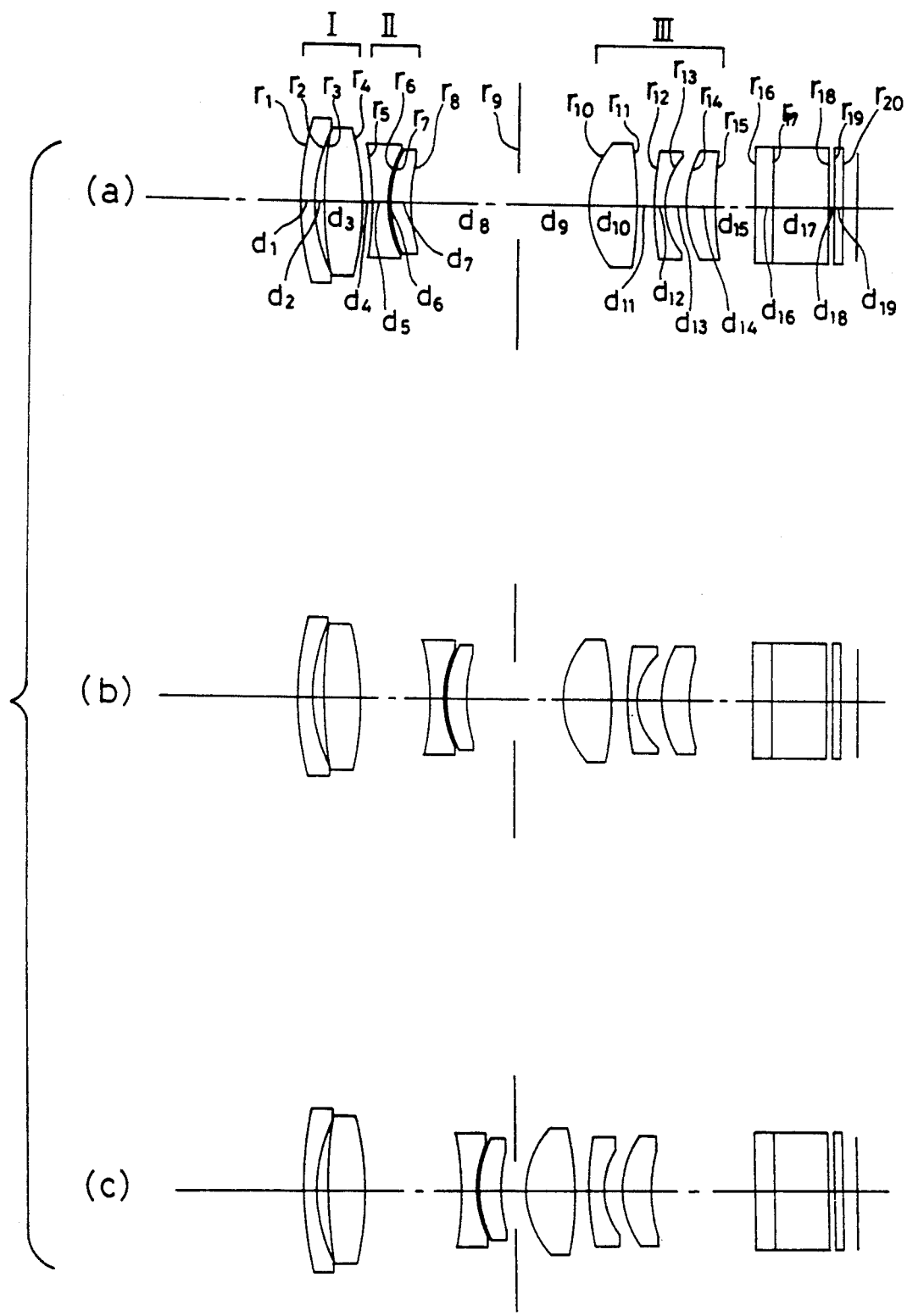
FIG. 1 represents in section lens arrangements according to Example 1 of this invention at the (a) wide angle end, (b) standard setting and (c) telephoto end, respectively.
Figure 2:
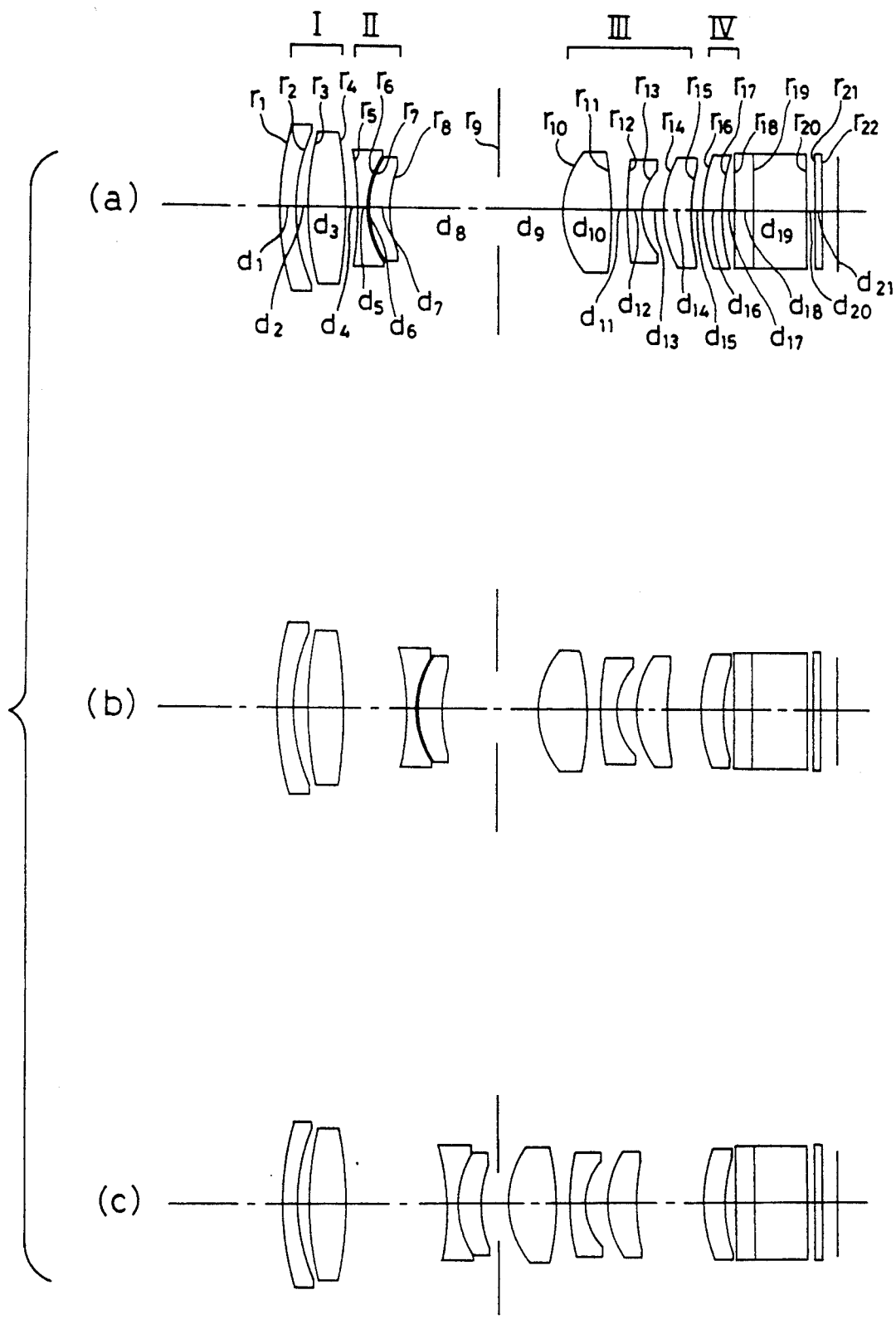
FIG. 2 is views similar to FIG. 1 showing Example 3 of this invention.
Figure 3:
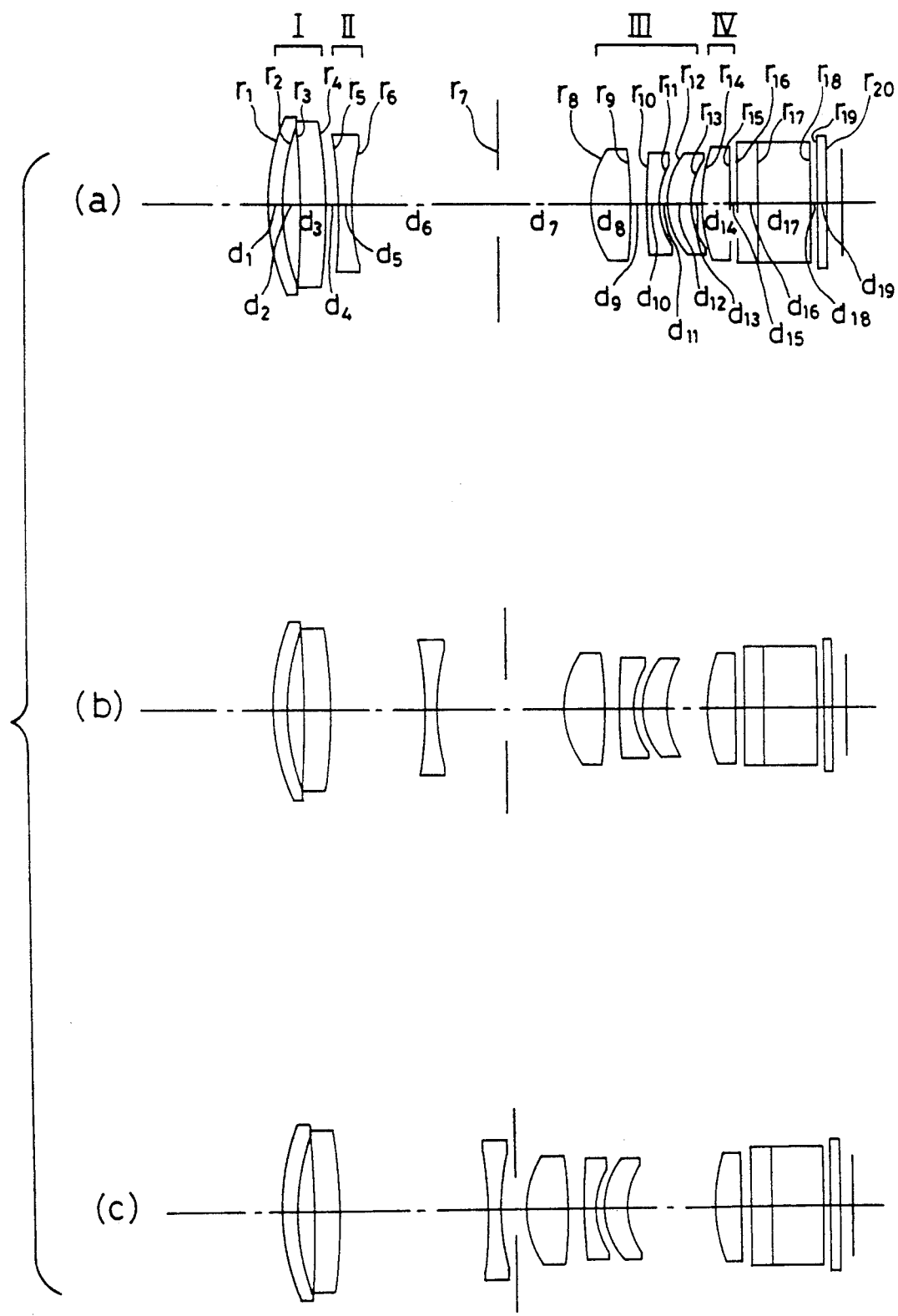
FIG. 3 is views similar to FIG. 1 showing Example 4 of this invention.
Figure 4:
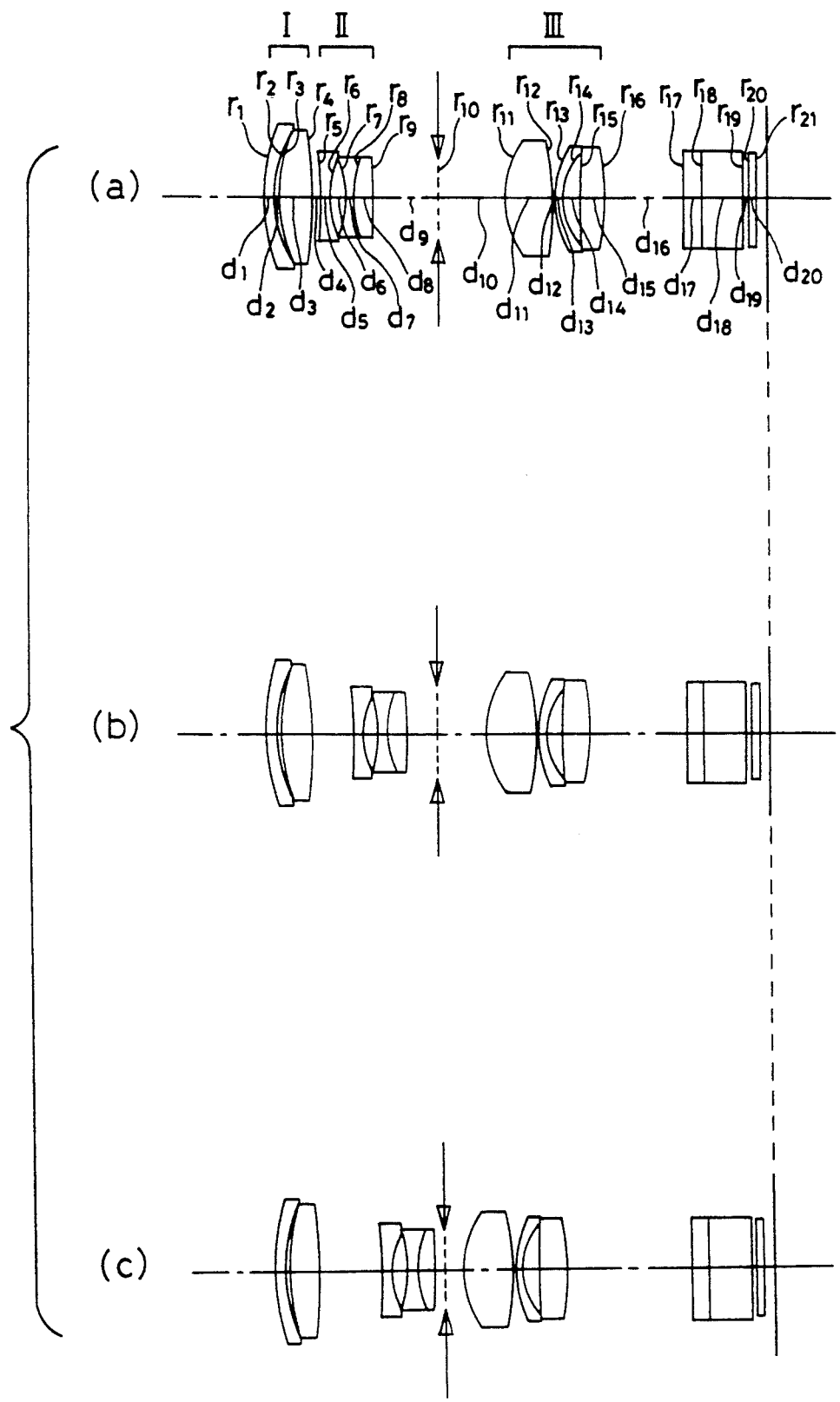
FIG. 4 is views similar to FIG. 1 showing Example 6 of this invention.
Figure 5:
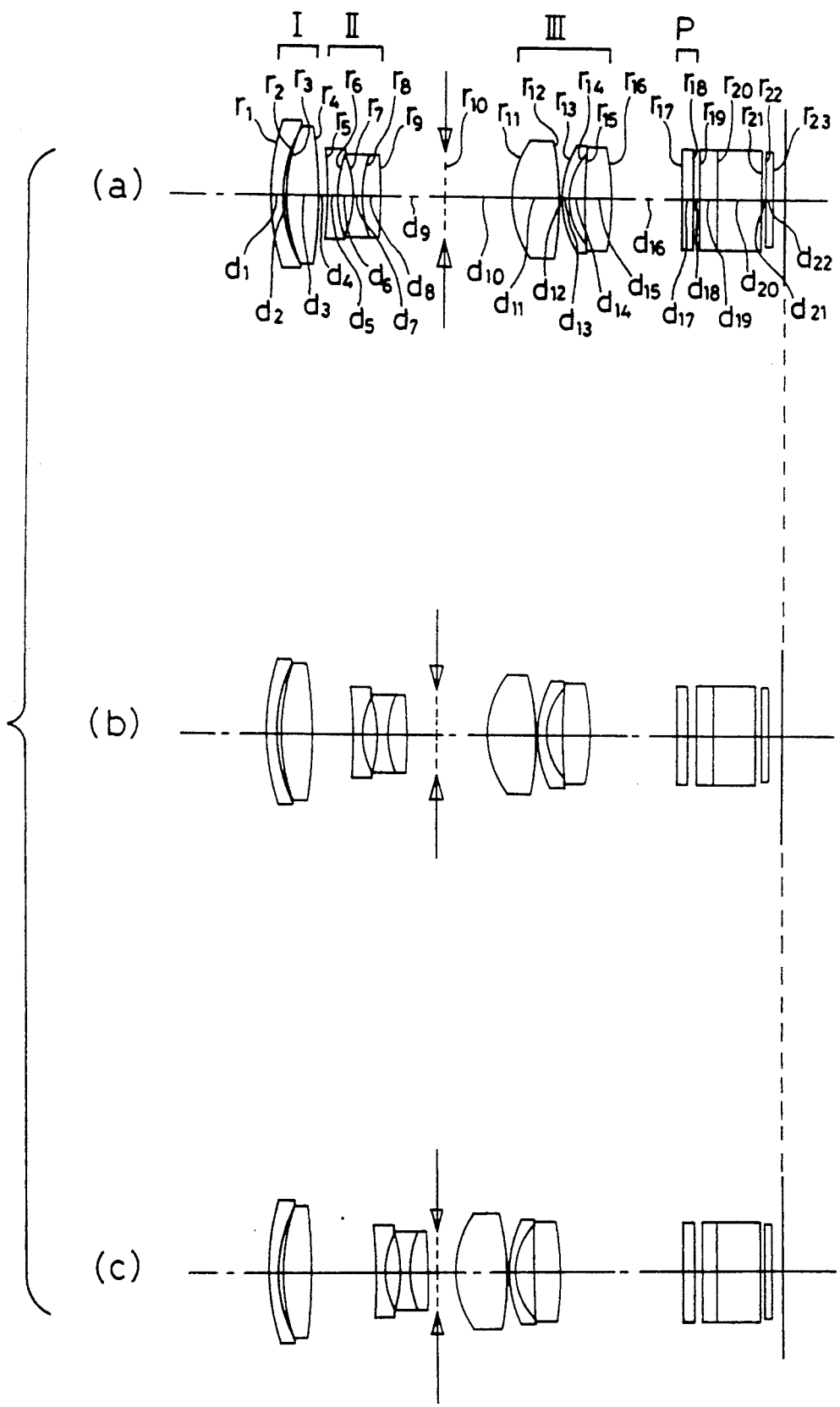
FIG. 5 is views similar to FIG. 1 showing Example 7 of this invention.
Figure 6:
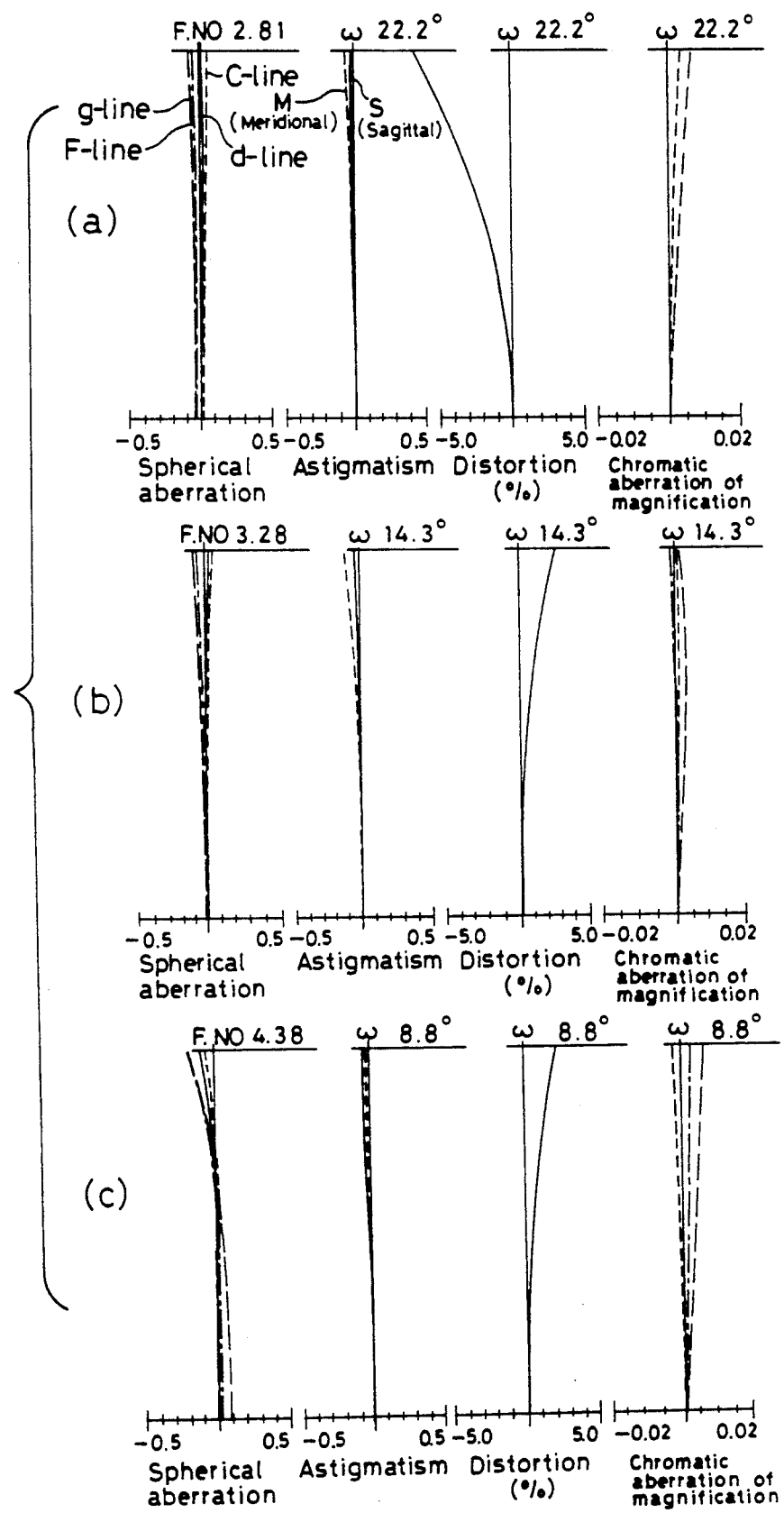
FIG. 6 is aberration diagrams showing the spherical aberration, astigmatism, distortion and chromatic aberration of magnification of Example 1 at the (a) wide angle end, (b) standard setting and (c) telephoto end, respectively.
Figure 7:
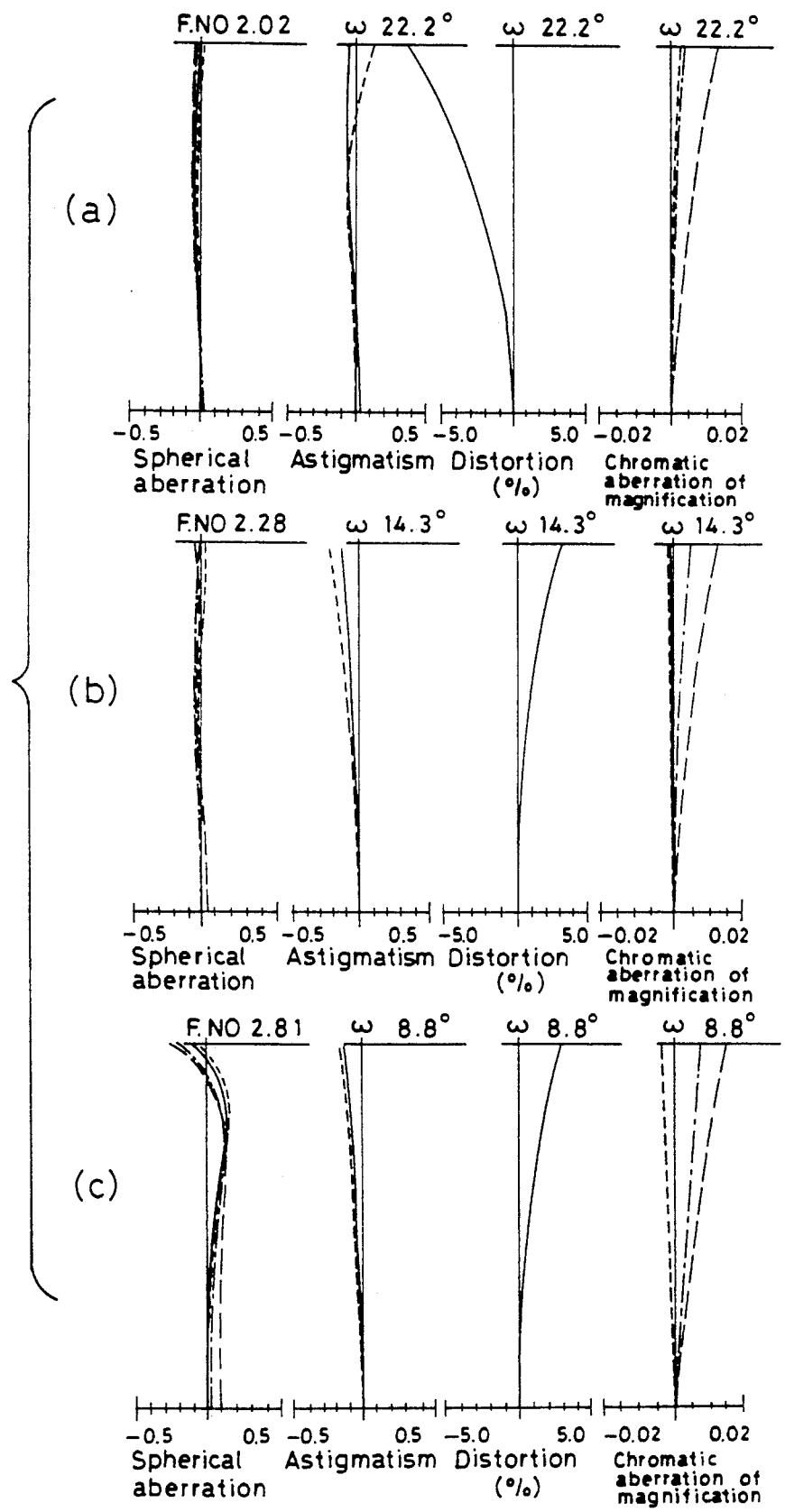
FIG. 7 is views similar to FIG. 6 showing Example 2 of this invention.
Figure 8:
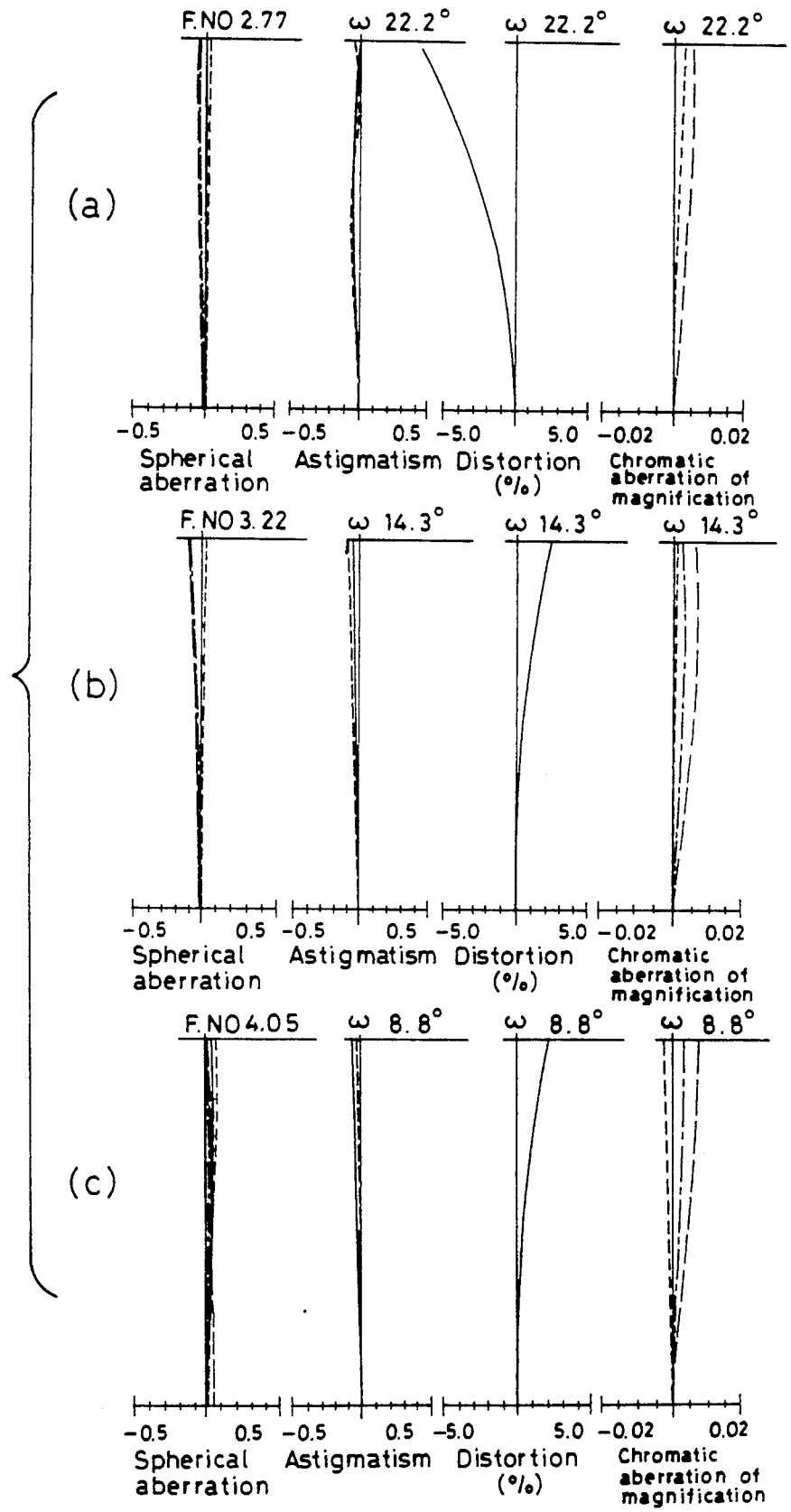
FIG. 8 is views similar to FIG. 6 showing Example 3 of this invention.
Figure 9:
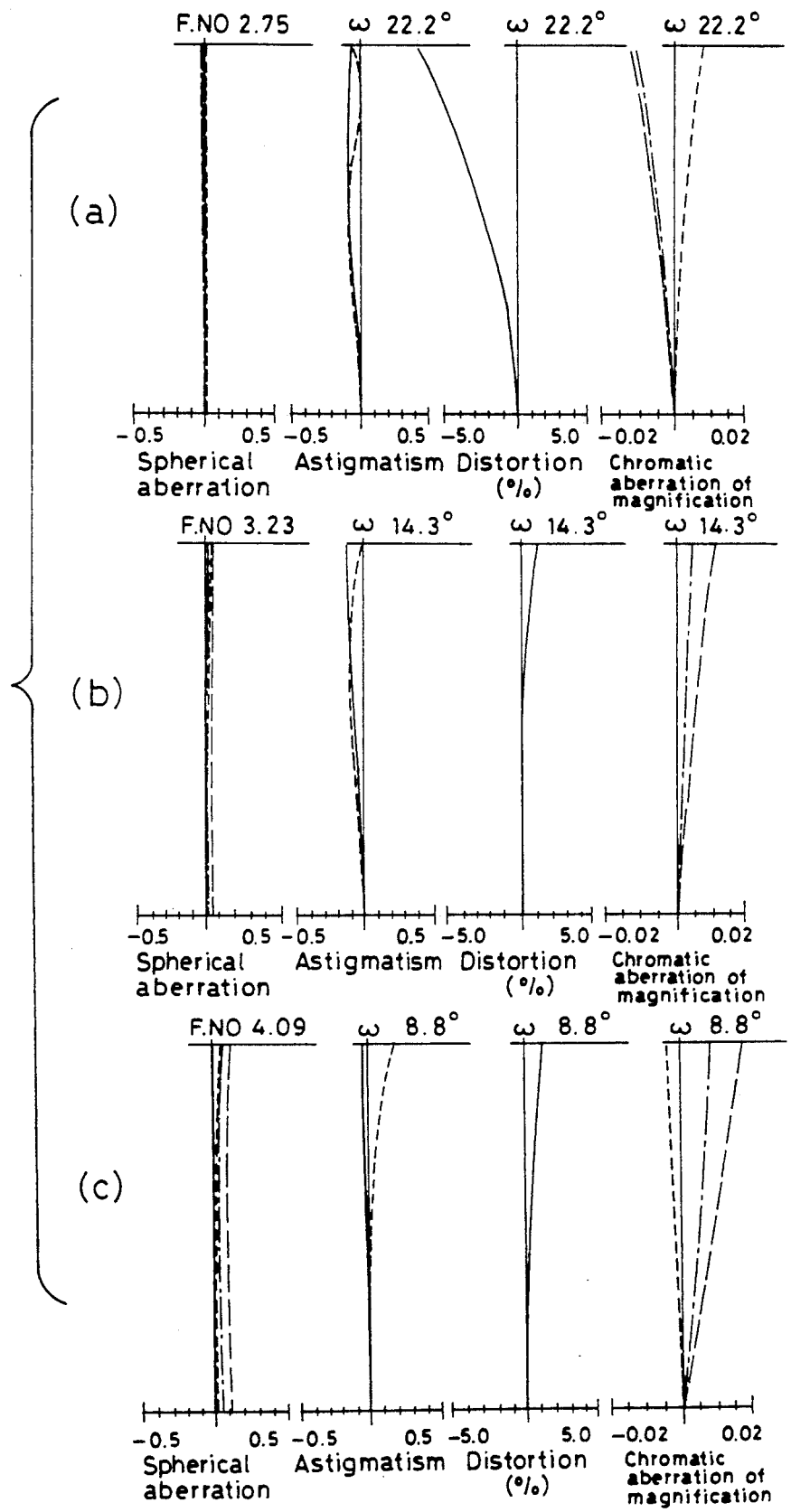
FIG. 9 is views similar to FIG. 6 showing Example 4 of this invention.
Figure 10:
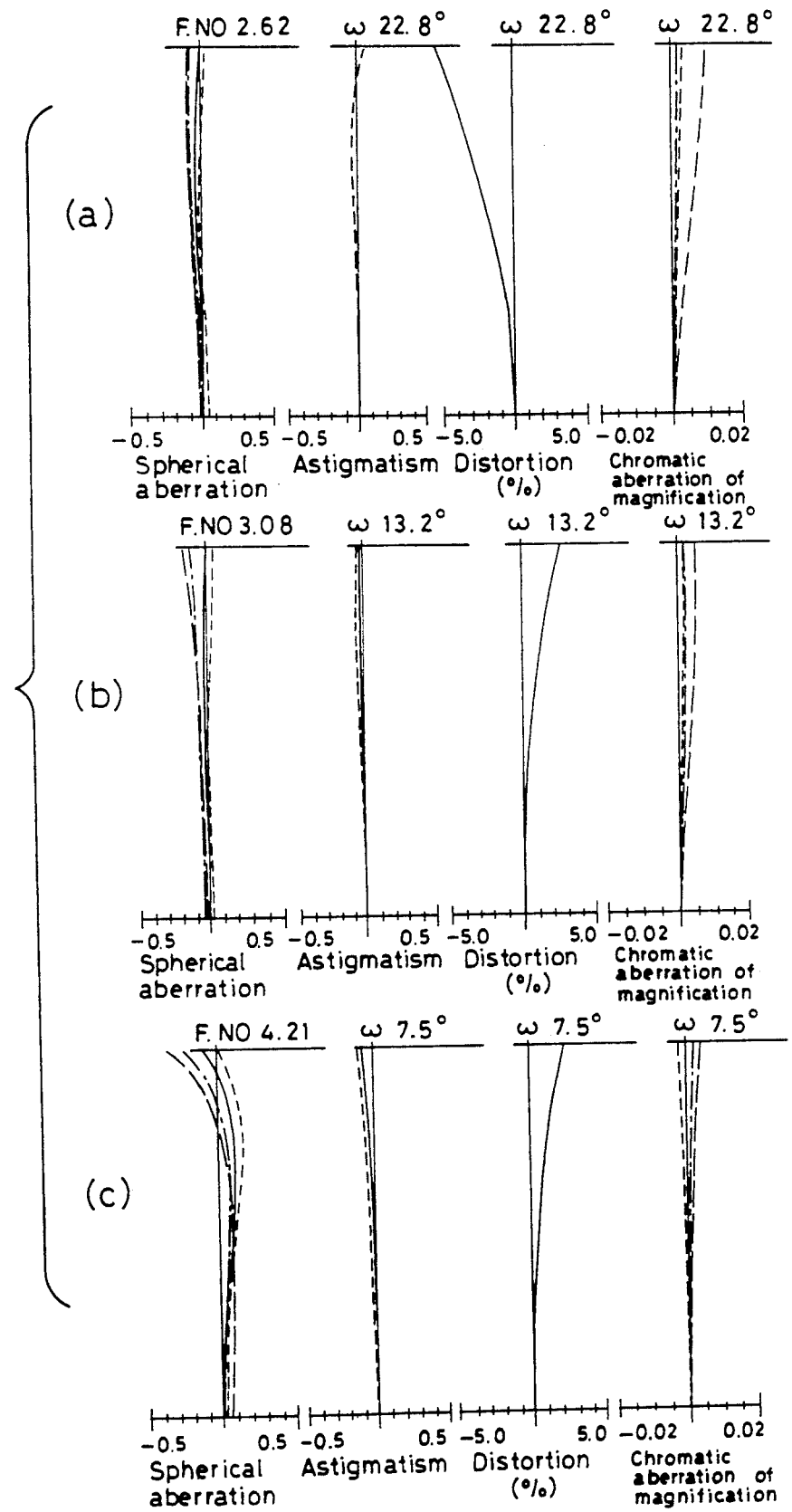
FIG. 10 is views similar to FIG. 6 showing Example 5 of this invention.

In the description that follows, reference will be made to Examples 1-7 of the zoom lens system according to this invention, the lens data of which will be given later. The lens arrangements of Examples 1, 3, 4, 6 and 7 at the (a) wide angle ends, (b) standard settings and (c) telephoto ends are shown in section in FIGS. 1, 2, 3, 4 and 5, respectively. Note that the sections of the lens arrangements of Examples 2 and 5 are almost similar to that of Example 1 and so are omitted from the accompanying drawings.

Examples 1, 2 and 5-7 are directed to three-unit zoom lens systems, while Examples 3 and 4 to four-unit zoom lens systems.

Throughout the examples, each first lens group I comprises two lenses or, in order from the object side, a concave meniscus lens having an increased curvature on the image side and a double-convex lens. In Examples 1 and 3-5 each second lens group II comprises two lenses or, in order from the object side, a double-concave lens and a positive meniscus lens having an increased curvature on the object side; in Example 4 it comprises a double-concave lens; and in Example 6 or 7, it comprises three lenses or, in order from the object side, a double-concave lens and a double-concave lens cemented to a double-convex. In Examples 1-5 each third lens group III comprises three lenses or, in order from the object side, a double-convex lens, a negative meniscus lens having an increased curvature on the image side and a positive meniscus lens having an increased curvature on the object side; and in Example 6 or 7 it comprises three lenses or, in order from the object side, a double-convex lens, a negative meniscus lens having an increased curvature on the image side and a double-convex lens. In Example 3 or 4, the fourth lens group IV comprises a positive meniscus lens having an increased curvature on the object side.

Referring now to aspherical configurations, two spherical surfaces are used in each of Examples 1-5; one spherical surface is applied to the object-side surface of the first lens of the third lens group III and another to the object-side surface of the third lens of the third lens group III. Throughout the examples, each aspherical surface decreases in positive refractive power as it goes off center. In Example 6 or 7, two spherical surface are applied to the object-side surface of the first lens of the third lens group II and the image-side surface of the third lens, respectively. In Example 7, however, an additional fixed parallel plane plate P is placed on the image side of the third lens group III, said plate having an aspherical surface on the object side.

It is noted that the 16th-20th surfaces of each of Examples 1, 2, 4 and 5, the 18th-22nd surfaces of Examples 3, the 17th-21st surfaces of Example 6 and the 19th-23rd surfaces of Example 7 denote optical members such as filters.

In the ensuing description, various symbols referred to there but not hereinbefore have the following meanings:

f . . . the focal length of the total system
$F_{NO}$ . . . F-number
$\omega$ . . . half-field angle
$r_1, r_2, \ldots$ the radius of curvature of each lens surface
$d_1, d_2, \ldots$ the separation between adjacent lens surfaces
$n_{d1}, n_{d2}, \ldots$ the d-line refractive index of each lens
$\nu_{d1}, \nu_{d2}, \ldots$ the Abbe's number of each lens Let x and y denote the optical direction and the direction perpendicular thereto, then the aspherical shape is defined by $$x = (y^2/r)/[1+\{1-P(y^2/r^2)\}^{\frac{1}{2}}] + A_4 y^4 + A_6 y^6 + A_8 y^8 + A_{10} y^{10}.$$

Here r is the paraxial radius of curvature, P is the conical coefficient and $A_4$, $A_6$, $A_8$ and $A_{10}$ each are the aspherical coefficient.

Example 1

$f = 7.73 \sim 12.32 \sim 19.64$
$F_{NO} = 2.81 \sim 3.28 \sim 4.38$
$\omega = 22.2 \sim 14.3 \sim 8.8°$

| | | | |
|---|---|---|---|
| $r_1 = 19.3944$ | $d_1 = 0.8788$ | $n_{d1} = 1.84666$ | $\nu_{d1} = 23.78$ |
| $r_2 = 10.3662$ | $d_2 = 0.6339$ | | |
| $r_3 = 23.4331$ | $d_3 = 2.3028$ | $n_{d2} = 1.69680$ | $\nu_{d2} = 56.49$ |
| $r_4 = -18.4690$ | $d_4 = $ (Variable) | | |
| $r_5 = -11.0045$ | $d_5 = 0.7798$ | $n_{d3} = 1.69680$ | $\nu_{d3} = 56.49$ |
| $r_6 = 6.5858$ | $d_6 = 0.0314$ | | |
| $r_7 = 5.9201$ | $d_7 = 1.4682$ | $n_{d4} = 1.84666$ | $\nu_{d4} = 23.78$ |
| $r_8 = 11.3887$ | $d_8 = $ (Variable) | | |
| $r_9 = \infty$ (Stop) | $d_9 = $ (Variable) | | |
| $r_{10} = 5.1881$ (Aspheric) | $d_{10} = 2.9040$ | $n_{d5} = 1.69350$ | $\nu_{d5} = 53.23$ |
| $r_{11} = -18.8240$ | $d_{11} = 0.9166$ | | |
| $r_{12} = 17.0971$ | $d_{12} = 0.6983$ | $n_{d6} = 1.84666$ | $\nu_{d6} = 23.78$ |
| $r_{13} = 4.0378$ | $d_{13} = 1.3416$ | | |
| $r_{14} = 5.6898$ (Aspheric) | $d_{14} = 1.7345$ | $n_{d7} = 1.69350$ | $\nu_{d7} = 53.23$ |
| $r_{15} = 14.6742$ | $d_{15} = $ (Variable) | | |
| $r_{16} = \infty$ | $d_{16} = 1.2000$ | $n_{d8} = 1.51633$ | $\nu_{d8} = 64.15$ |
| $r_{17} = \infty$ | $d_{17} = 3.3000$ | $n_{d9} = 1.54771$ | $\nu_{d9} = 62.83$ |
| $r_{18} = \infty$ | $d_{18} = 0.3750$ | | |
| $r_{19} = \infty$ | $d_{19} = 0.4500$ | $n_{d10} = 1.51633$ | $\nu_{d10} = 64.15$ |

Zooming Specs

| f | 7.73 | 12.32 | 19.64 |
|---|---|---|---|
| $d_4$ | 0.763 | 4.276 | 6.130 |
| $d_8$ | 6.167 | 2.654 | 0.800 |
| $d_9$ | 4.725 | 3.282 | 0.800 |
| $d_{15}$ | 2.481 | 3.923 | 6.406 |

Aspherical Coefficients

10th surface
P = 1
$A_4 = -0.81725 \times 10^{-3}$
$A_6 = -0.25980 \times 10^{-4}$
$A_8 = -0.58984 \times 10^{-6}$ 14th surface
P = 1
$A_4 = -0.88306 \times 10^{-3}$
$A_6 = -0.23644 \times 10^{-4}$
$A_8 = 0.20302 \times 10^{-5}$
$\beta_{3T}/\beta_{3W} = 1.40 \times \beta_{2T}/\beta_{2W}$
$f_3/|f_2| = 0.88$
$(r_{31F} + r_{31R})/(r_{31F} - r_{31R}) = -0.57$
$(r_{32F} + r_{32R})/(r_{32F} - r_{32R}) = -1.618$
$r_{32R}/r_{33F} = 0.710$
$|\Delta_X|/\{(f_W \cdot f_T)^{\frac{1}{2}} F_{NO}^3\} = 1.88 \times 10^{-3}$
$D_{III}/(f_W \cdot f_T)^{\frac{1}{2}} = 0.616$

Example 2

$f = 7.73 \sim 12.32 \sim 19.64$
$F_{NO} = 2.02 \sim 2.28 \sim 2.81$
$\omega = 22.2 \sim 14.3 \sim 8.8°$

| | | | |
|---|---|---|---|
| $r_1 = 13.3135$ | $d_1 = 0.8487$ | $n_{d1} = 1.84666$ | $\nu_{d1} = 23.78$ |
| $r_2 = 9.4848$ | $d_2 = 1.1664$ | | |
| $r_3 = 42.3271$ | $d_3 = 2.3077$ | $n_{d2} = 1.69680$ | $\nu_{d2} = 56.49$ |
| $r_4 = -19.4338$ | $d_4 = $ (Variable) | | |
| $r_5 = -11.5165$ | $d_5 = 0.6988$ | $n_{d3} = 1.69680$ | $\nu_{d3} = 56.49$ |
| $r_6 = 8.0295$ | $d_6 = 0.0317$ | | |
| $r_7 = 6.9680$ | $d_7 = 1.4673$ | $n_{d4} = 1.84666$ | $\nu_{d4} = 23.78$ |
| $r_8 = 12.2532$ | $d_8 = $ (Variable) | | |
| $r_9 = \infty$ (Stop) | $d_9 = $ (Variable) | | |
| $r_{10} = 5.5206$ (Aspheric) | $d_{10} = 3.2160$ | $n_{d5} = 1.69350$ | $\nu_{d5} = 53.23$ |
| $r_{11} = -17.8955$ | $d_{11} = 0.1117$ | | |
| $r_{12} = 14.1507$ | $d_{12} = 0.6999$ | $n_{d6} = 1.84666$ | $\nu_{d6} = 23.78$ |
| $r_{13} = 4.3953$ | $d_{13} = 0.5538$ | | |

-continued

| | | |
|---|---|---|
| $r_{14} = 9.8984$ (Aspheric) | $d_{14} = 1.6768$ | $n_{d7} = 1.69350 \quad \nu_{d7} = 53.23$ |
| $r_{15} = 241.3552$ | $d_{15}$ = (Variable) | |
| $r_{16} = \infty$ | $d_{16} = 1.2000$ | $n_{d8} = 1.51633 \quad \nu_{d8} = 64.15$ |
| $r_{17} = \infty$ | $d_{17} = 3.3000$ | $n_{d9} = 1.54771 \quad \nu_{d9} = 62.83$ |
| $r_{18} = \infty$ | $d_{18} = 0.3750$ | |
| $r_{19} = \infty$ | $d_{19} = 0.4500$ | $n_{d10} = 1.51633 \quad \nu_{d10} = 64.15$ |
| $r_{20} = \infty$ | | |

Zooming Specs

| f | 7.73 | 12.32 | 19.64 |
|---|---|---|---|
| $d_4$ | 0.763 | 4.687 | 7.136 |
| $d_8$ | 7.173 | 3.249 | 0.801 |
| $d_9$ | 4.360 | 2.987 | 0.797 |
| $d_{15}$ | 4.294 | 5.667 | 7.856 |

Aspherical Coefficients

10th surface $P = 1$
$A_4 = -0.80069 \times 10^{-3}$
$A_6 = -0.12640 \times 10^{-4}$
$A_8 = -0.10605 \times 10^{-5}$
$A_{10} = 0.52813 \times 10^{-8}$ 14th surface $P = 1$
$A_4 = -0.59282 \times 10^{-4}$
$A_6 = -0.40714 \times 10^{-4}$
$A_8 = 0.34334 \times 10^{-5}$
$A_{10} = 0.47012 \times 10^{-6}$
$\beta_{3T}/\beta_{3W} = 1.30 \times \beta_{2T}/\beta_{2W}$
$f_3/|f_2| = 0.97$
$(r_{31F} + r_{31R})/(r_{31F} - r_{31R}) = -0.53$
$(r_{32F} + r_{32R})/(r_{32F} - r_{32R}) = -1.901$
$r_{32R}/r_{33F} = 0.440$
$|\Delta_X|/\{(f_W \cdot f_T)^{\frac{1}{2}} F_{NO}^3\} = 4.3 \times 10^{-3}$
$D_{III}/(f_W \cdot f_T)^{\frac{1}{2}} = 0.508$ Example 3

$f = 7.73 \sim 12.32 \sim 19.64$
$F_{NO} = 2.77 \sim 3.22 \sim 4.05$
$\omega = 22.2 \sim 14.3 \sim 8.8°$

| | | |
|---|---|---|
| $r_1 = 17.5049$ | $d_1 = 0.8978$ | $n_{d1} = 1.84666 \quad \nu_{d1} = 23.78$ |
| $r_2 = 10.5005$ | $d_2 = 0.7694$ | |
| $r_3 = 19.8228$ | $d_3 = 2.3338$ | $n_{d2} = 1.69680 \quad \nu_{d2} = 56.49$ |
| $r_4 = -21.2277$ | $d_4$ = (Variable) | |
| $r_5 = -12.5918$ | $d_5 = 0.6118$ | $n_{d3} = 1.69680 \quad \nu_{d3} = 56.49$ |
| $r_6 = 5.9734$ | $d_6 = 0.0302$ | |
| $r_7 = 5.5266$ | $d_7 = 1.4697$ | $n_{d4} = 1.84666 \quad \nu_{d4} = 23.78$ |
| $r_8 = 9.6937$ | $d_8$ = (Variable) | |
| $r_9 = \infty$ (Stop) | $d_9$ = (Variable) | |
| $r_{10} = 5.1682$ (Aspheric) | $d_{10} = 2.9793$ | $n_{d5} = 1.69350 \quad \nu_{d5} = 53.23$ |
| $r_{11} = -17.4785$ | $d_{11} = 0.9020$ | |
| $r_{12} = 24.9893$ | $d_{12} = 0.9308$ | $n_{d6} = 1.84666 \quad \nu_{d6} = 23.78$ |
| $r_{13} = 3.9371$ | $d_{13} = 1.2093$ | |
| $r_{14} = 5.9508$ (Aspheric) | $d_{14} = 1.7629$ | $n_{d7} = 1.69350 \quad \nu_{d7} = 53.23$ |
| $r_{15} = 17.6297$ | $d_{15}$ = (Variable) | |
| $r_{16} = 11.0090$ | $d_{16} = 1.5000$ | $n_{d8} = 1.69895 \quad \nu_{d8} = 30.12$ |
| $r_{17} = 15.5765$ | $d_{17} = 0.5000$ | |
| $r_{18} = \infty$ | $d_{18} = 1.2000$ | $n_{d9} = 1.51633 \quad \nu_{d9} = 64.15$ |
| $r_{19} = \infty$ | $d_{19} = 3.3000$ | $n_{d10} = 1.54771 \quad \nu_{d10} = 62.83$ |
| $r_{20} = \infty$ | $d_{20} = 0.3750$ | |
| $r_{21} = \infty$ | $d_{21} = 0.4500$ | $n_{d11} = 1.51633 \quad \nu_{d11} = 64.15$ |
| $r_{22} = \infty$ | | |

Zooming Specs

| f | 7.73 | 12.32 | 19.64 |
|---|---|---|---|
| $d_4$ | 0.763 | 3.973 | 6.240 |
| $d_8$ | 6.277 | 3.067 | 0.800 |
| $d_9$ | 4.273 | 2.848 | 0.800 |
| $d_{15}$ | 0.611 | 2.035 | 4.084 |

Aspherical Coefficients

10th surface $P = 1$
$A_4 = -0.85931 \times 10^{-3}$
$A_6 = -0.25833 \times 10^{-4}$
$A_8 = -0.55901 \times 10^{-6}$ 14th surface $P = 1$
$A_4 = -0.55807 \times 10^{-3}$
$A_6 = -0.52489 \times 10^{-4}$
$A_8 = 0.56295 \times 10^{-5}$
$\beta_{3T}/\beta_{3W} = 1.08 \times \beta_{2T}/\beta_{2W}$
$f_3/|f_2| = 0.80$
$(r_{31F} + r_{31R})/(r_{31F} - r_{31R}) = -0.54$
$(r_{32F} + r_{32R})/(r_{32F} - r_{32R}) = 1.374$
$r_{32R}/r_{33F} = 0.660$
$|\Delta_X|/\{(f_W \cdot f_T)^{\frac{1}{2}} F_{NO}^3\} = 9.97 \times 10^{-3}$
$D_{III}/(f_W \cdot f_T)^{\frac{1}{2}} = 0.632$ Example 4

$f = 7.73 \sim 12.32 \sim 19.64$
$F_{NO} = 2.75 \sim 3.23 \sim 4.09$
$\omega = 22.2 \sim 14.3 \sim 8.8°$

| | | |
|---|---|---|
| $r_1 = 12.7093$ | $d_1 = 0.9000$ | $n_{d1} = 1.84666 \quad \nu_{d1} = 23.78$ |
| $r_2 = 12.9208$ | $d_2 = 0.9036$ | |
| $r_3 = 201.1721$ | $d_3 = 1.7955$ | $n_{d2} = 1.69680 \quad \nu_{d2} = 56.49$ |
| $r_4 = -39.5354$ | $d_4$ = (Variable) | |
| $r_5 = -22.8157$ | $d_5 = 0.7913$ | $n_{d3} = 1.61800 \quad \nu_{d3} = 63.38$ |
| $r_6 = 15.5874$ | $d_6$ = (Variable) | |
| $r_7 = \infty$ (Stop) | $d_7$ = (Variable) | |
| $r_8 = 5.1543$ (Aspheric) | $d_8 = 2.5022$ | $n_{d4} = 1.69350 \quad \nu_{d4} = 53.23$ |
| $r_9 = -22.3031$ | $d_9 = 0.9119$ | |
| $r_{10} = 32.2246$ | $d_{10} = 0.7024$ | $n_{d5} = 1.84666 \quad \nu_{d5} = 23.78$ |
| $r_{11} = 4.1669$ | $d_{11} = 0.6233$ | |
| $r_{12} = 4.5536$ (Aspheric) | $d_{12} = 1.4312$ | $n_{d6} = 1.69350 \quad \nu_{d6} = 53.23$ |
| $r_{13} = 5.2340$ | $d_{13}$ = (Variable) | |
| $r_{14} = 8.9826$ | $d_{14} = 1.7462$ | $n_{d7} = 1.69895 \quad \nu_{d7} = 30.12$ |
| $r_{15} = 369.4686$ | $d_{15} = 0.4813$ | |
| $r_{16} = \infty$ | $d_{16} = 1.2000$ | $n_{d8} = 1.51633 \quad \nu_{d8} = 64.15$ |
| $r_{17} = \infty$ | $d_{17} = 3.3000$ | $n_{d9} = 1.54771 \quad \nu_{d9} = 62.83$ |
| $r_{18} = \infty$ | $d_{18} = 0.3750$ | |
| $r_{19} = \infty$ | $d_{19} = 0.4500$ | $n_{d10} = 1.51633 \quad \nu_{d10} = 64.15$ |
| $r_{20} = \infty$ | | |

Zooming Specs

| f | 7.73 | 12.32 | 19.64 |
|---|---|---|---|
| $d_4$ | 0.763 | 5.618 | 9.060 |
| $d_6$ | 9.097 | 4.241 | 0.800 |
| $d_7$ | 5.427 | 3.496 | 0.700 |
| $d_{13}$ | 0.500 | 2.432 | 5.227 |

Aspherical Coefficients

8th surface $P = 1$
$A_4 = -0.65095 \times 10^{-3}$
$A_6 = -0.16721 \times 10^{-4}$
$A_8 = -0.11123 \times 10^{-5}$ 12th surface $P = 1$
$A_4 = -0.94384 \times 10^{-3}$
$A_6 = -0.10989 \times 10^{-3}$
$A_8 = 0.68574 = 10^{-5}$
$\beta_{3T}/\beta_{3W} = 1.13 \times \beta_{2T}/\beta_{2W}$
$f_3/|f_2| = 0.92$
$(r_{31F} + r_{31R})/(r_{31F} - r_{31R}) = -0.63$
$(r_{32F} + r_{32R})/(r_{32F} - r_{32R}) = -1.297$
$r_{32R}/r_{33F} = 0.870$
$|\Delta_X|/\{(f_W \cdot f_T)^{\frac{1}{2}} F_{NO}^3\} = 1.17 \times 10^{-3}$
$D_{III}/(f_W \cdot f_T)^{\frac{1}{2}} = 0.501$ Example 5

$f = 7.50 \sim 13.42 \sim 24.00$
$F_{NO} = 2.62 \sim 3.08 \sim 4.21$
$\omega = 22.8 \sim 13.2 \sim 7.5°$

| | | |
|---|---|---|
| $r_1 = 21.9353$ | $d_1 = 0.8118$ | $n_{d1} = 1.84666 \quad \nu_{d1} = 23.78$ |
| $r_2 = 12.7786$ | $d_2 = 0.6952$ | |
| $r_3 = 19.3013$ | $d_3 = 2.4356$ | $n_{d2} = 1.69680 \quad \nu_{d2} = 56.49$ |
| $r_4 = -35.4060$ | $d_4$ = (Variable) | |
| $r_5 = -24.6054$ | $d_5 = 0.7986$ | $n_{d3} = 1.69680 \quad \nu_{d3} = 56.49$ |
| $r_6 = 5.4442$ | $d_6 = 0.6944$ | |
| $r_7 = 5.8118$ | $d_7 = 1.1753$ | $n_{d4} = 1.84666 \quad \nu_{d4} = 23.78$ |
| $r_8 = 9.2278$ | $d_8$ = (Variable) | |
| $r_9 = \infty$ (Stop) | $d_9$ = (Variable) | |
| $r_{10} = 5.5808$ (Aspheric) | $d_{10} = 2.7787$ | $n_{d5} = 1.69350 \quad \nu_{d5} = 53.23$ |
| $r_{11} = -24.4747$ | $d_{11} = 0.8598$ | |
| $r_{12} = 46.9540$ | $d_{12} = 0.7006$ | $n_{d6} = 1.84666 \quad \nu_{d6} = 23.78$ |
| $r_{13} = 5.5217$ | $d_{13} = 1.1696$ | |

-continued

| | | | |
|---|---|---|---|
| $r_{14} = 5.8640$ (Aspheric) | $d_{14} = 1.6469$ | $n_{d7} = 1.69350$ | $\nu_{d7} = 53.23$ |
| $r_{15} = 12.2989$ | $d_{15} = $ (Variable) | | |
| $r_{16} = \infty$ | $d_{16} = 1.2000$ | $n_{d8} = 1.51633$ | $\nu_{d8} = 64.15$ |
| $r_{17} = \infty$ | $d_{17} = 3.3000$ | $n_{d9} = 1.54771$ | $\nu_{d9} = 62.83$ |
| $r_{18} = \infty$ | $d_{18} = 0.3750$ | | |
| $r_{19} = \infty$ | $d_{19} = 0.4500$ | $n_{d10} = 1.51633$ | $\nu_{d10} = 64.15$ |
| $r_{20} = \infty$ | | | |

Zooming Specs

| f | 7.50 | 13.42 | 24.00 |
|---|---|---|---|
| $d_4$ | 0.763 | 5.939 | 8.968 |
| $d_8$ | 8.905 | 3.728 | 0.700 |
| $d_9$ | 5.364 | 3.668 | 0.721 |
| $d_{15}$ | 3.780 | 5.476 | 8.422 |

Aspherical Coefficients

10th surface
$P = 1$
$A_4 = -0.32350 \times 10^{-3}$
$A_6 = -0.23201 \times 10^{-4}$
$A_8 = -0.54541 \times 10^{-7}$ 14th surface
$P = 1$
$A_4 = -0.15595 \times 10^{-2}$
$A_6 = -0.23550 \times 10^{-5}$
$A_8 = -0.40280 \times 10^{-5}$ $\beta_{3T}/\beta_{3W} = 1.28 \times \beta_{2T}/\beta_{2W}$
$f_3/|f_2| = 0.85$
$(r_{31F} + r_{31R})/(r_{31F} - r_{31R}) = -0.63$
$(r_{32F} + r_{32R})/(r_{32F} - r_{32R}) = 1.266$
$r_{32R}/r_{33F} = 0.940$
$|\Delta_X|/\{(f_W \cdot f_T)^{\frac{1}{2}} F_{NO}^3\} = 7.50 \times 10^{-3}$
$D_{III}/(f_W \cdot f_T)^{\frac{1}{2}} = 0.533$

Example 6

$f = 10.30 \sim 16.42 \sim 26.19$
$F_{NO} = 2.06 \sim 2.37 \sim 3.30$
$\omega = 22.2 \sim 14.3 \sim 9.1°$

| | | | |
|---|---|---|---|
| $r_1 = 17.3245$ | $d_1 = 1.1000$ | $n_{d1} = 1.84666$ | $\nu_{d1} = 23.78$ |
| $r_2 = 11.8868$ | $d_2 = 0.4200$ | | |
| $r_3 = 15.0103$ | $d_3 = 3.2000$ | $n_{d2} = 1.69680$ | $\nu_{d2} = 55.52$ |
| $r_4 = -44.9603$ | $d_4 = $ (Variable) | | |
| $r_5 = -37.4832$ | $d_5 = 0.9000$ | $n_{d3} = 1.80100$ | $\nu_{d3} = 34.97$ |
| $r_6 = 9.1832$ | $d_6 = 1.4700$ | | |
| $r_7 = -9.4743$ | $d_7 = 0.8000$ | $n_{d4} = 1.58267$ | $\nu_{d4} = 46.33$ |
| $r_8 = 10.9950$ | $d_8 = 2.0000$ | $n_{d5} = 1.84666$ | $\nu_{d5} = 23.78$ |
| $r_9 = -35.9264$ | $d_9 = $ (Variable) | | |
| $r_{10} = \infty$ (Stop) | $d_{10} = $ (Variable) | | |
| $r_{11} = 7.6006$ (Aspheric) | $d_{11} = 5.0000$ | $n_{d6} = 1.58913$ | $\nu_{d6} = 61.18$ |
| $r_{12} = -19.0955$ | $d_{12} = 0.1500$ | | |
| $r_{13} = 13.1572$ | $d_{13} = 0.8000$ | $n_{d7} = 1.84666$ | $\nu_{d7} = 23.78$ |
| $r_{14} = 6.2559$ | $d_{14} = 1.6400$ | | |
| $r_{15} = 30.5774$ | $d_{15} = 2.9000$ | $n_{d8} = 1.60311$ | $\nu_{d8} = 60.70$ |
| $r_{16} = -25.8351$ (Aspheric) | $d_{16} = $ (Variable) | | |
| $r_{17} = \infty$ | $d_{17} = 1.6000$ | $n_{d9} = 1.51633$ | $\nu_{d9} = 64.15$ |
| $r_{18} = \infty$ | $d_{18} = 4.4000$ | $n_{d10} = 1.54771$ | $\nu_{d10} = 62.83$ |
| $r_{19} = \infty$ | $d_{19} = 0.5000$ | | |
| $r_{20} = \infty$ | $d_{20} = 0.6000$ | $n_{d11} = 1.51633$ | $\nu_{d11} = 64.15$ |
| $r_{21} = \infty$ | | | |

Zooming Specs

| f | 10.30 | 16.42 | 26.19 |
|---|---|---|---|
| $d_4$ | 1.000 | 4.146 | 6.325 |
| $d_9$ | 6.325 | 3.179 | 1.000 |
| $d_{10}$ | 6.577 | 4.616 | 1.800 |
| $d_{16}$ | 8.136 | 10.097 | 12.913 |

Aspherical Coefficients

11th surface
$P = 1$
$A_4 = -0.44530 \times 10^{-3}$
$A_6 = -0.11465 \times 10^{-5}$
$A_8 = -0.97900 \times 10^{-7}$ 16th surface
$P = 1$
$A_4 = -0.94684 \times 10^{-4}$
$A_6 = 0.69271 \times 10^{-5}$
$A_8 = -0.55011 \times 10^{-6}$ $\beta_{3T}/\beta_{3W} = 0.966 \times \beta_{2T}/\beta_{2W}$
$f_3/|f_2| = 1.49$
$(r_{31F} + r_{31R})/(r_{31F} - r_{31R}) = -0.431$
$(r_{32F} + r_{32R})/(r_{32F} - r_{32R}) = -2.813$
$r_{32R}/r_{33F} = 0.205$
$|\Delta_X|/\{(f_W \cdot f_T)^{\frac{1}{2}} F_{NO}^3\} = 2.33 \times 10^{-3}$
$D_{III}/(f_W \cdot f_T)^{\frac{1}{2}} = 0.639$

Example 7

$f = 10.30 \sim 16.42 \sim 26.19$
$F_{NO} = 2.06 \sim 2.37 \sim 3.30$
$\omega = 22.2 \sim 14.3 \sim 9.1°$

| | | | |
|---|---|---|---|
| $r_1 = 17.5774$ | $d_1 = 1.1000$ | $n_{d1} = 1.84666$ | $\nu_{d1} = 23.78$ |
| $r_2 = 12.1065$ | $d_2 = 0.3700$ | | |
| $r_3 = 14.9556$ | $d_3 = 3.2000$ | $n_{d2} = 1.69680$ | $\nu_{d2} = 55.52$ |
| $r_4 = -49.1453$ | $d_4 = $ (Variable) | | |
| $r_5 = -38.5589$ | $d_5 = 0.9000$ | $n_{d3} = 1.80100$ | $\nu_{d3} = 34.97$ |
| $r_6 = 9.0436$ | $d_6 = 1.5000$ | | |
| $r_7 = -9.5917$ | $d_7 = 0.8000$ | $n_{d4} = 1.58267$ | $\nu_{d4} = 46.33$ |
| $r_8 = 10.9495$ | $d_8 = 2.0000$ | $n_{d5} = 1.84666$ | $\nu_{d5} = 23.78$ |
| $r_9 = -34.9714$ | $d_9 = $ (Variable) | | |
| $r_{10} = \infty$ (Stop) | $d_{10} = $ (Variable) | | |
| $r_{11} = 7.7536$ | $d_{11} = 5.0000$ | $n_{d6} = 1.58913$ | $\nu_{d6} = 61.18$ |
| (Aspheric) | | | |
| $r_{12} = -18.4124$ | $d_{12} = 0.1500$ | | |
| $r_{13} = 13.1789$ | $d_{13} = 0.8000$ | $n_{d7} = 1.84666$ | $\nu_{d7} = 23.78$ |
| $r_{14} = 6.2235$ | $d_{14} = 1.7000$ | | |
| $r_{15} = 29.4780$ | $d_{15} = 2.9000$ | $n_{d8} = 1.60311$ | $\nu_{d8} = 60.70$ |
| $r_{16} = -25.6509$ (Aspheric) | $d_{16} = $ (Variable) | | |
| $r_{17} = \infty$ (Aspheric) | $d_{17} = 1.0000$ | $n_{d9} = 1.49216$ | $\nu_{d9} = 57.50$ |
| $r_{18} = \infty$ | $d_{18} = 0.7811$ | | |
| $r_{19} = \infty$ | $d_{19} = 1.6000$ | $n_{d10} = 1.51633$ | $\nu_{d10} = 64.15$ |
| $r_{20} = \infty$ | $d_{20} = 4.4000$ | $n_{d11} = 1.54771$ | $\nu_{d11} = 62.83$ |
| $r_{21} = \infty$ | $d_{21} = 0.5000$ | | |
| $r_{22} = \infty$ | $d_{22} = 0.6000$ | $n_{d12} = 1.51633$ | $\nu_{d12} = 64.15$ |
| $r_{23} = \infty$ | | | |

Zooming Specs

| f | 10.30 | 16.42 | 26.19 |
|---|---|---|---|
| $d_4$ | 1.000 | 4.199 | 6.380 |
| $d_9$ | 6.380 | 3.180 | 1.000 |
| $d_{10}$ | 6.653 | 4.684 | 1.800 |
| $d_{16}$ | 6.822 | 8.792 | 11.675 |

Aspherical Coefficients

Figure 11A:
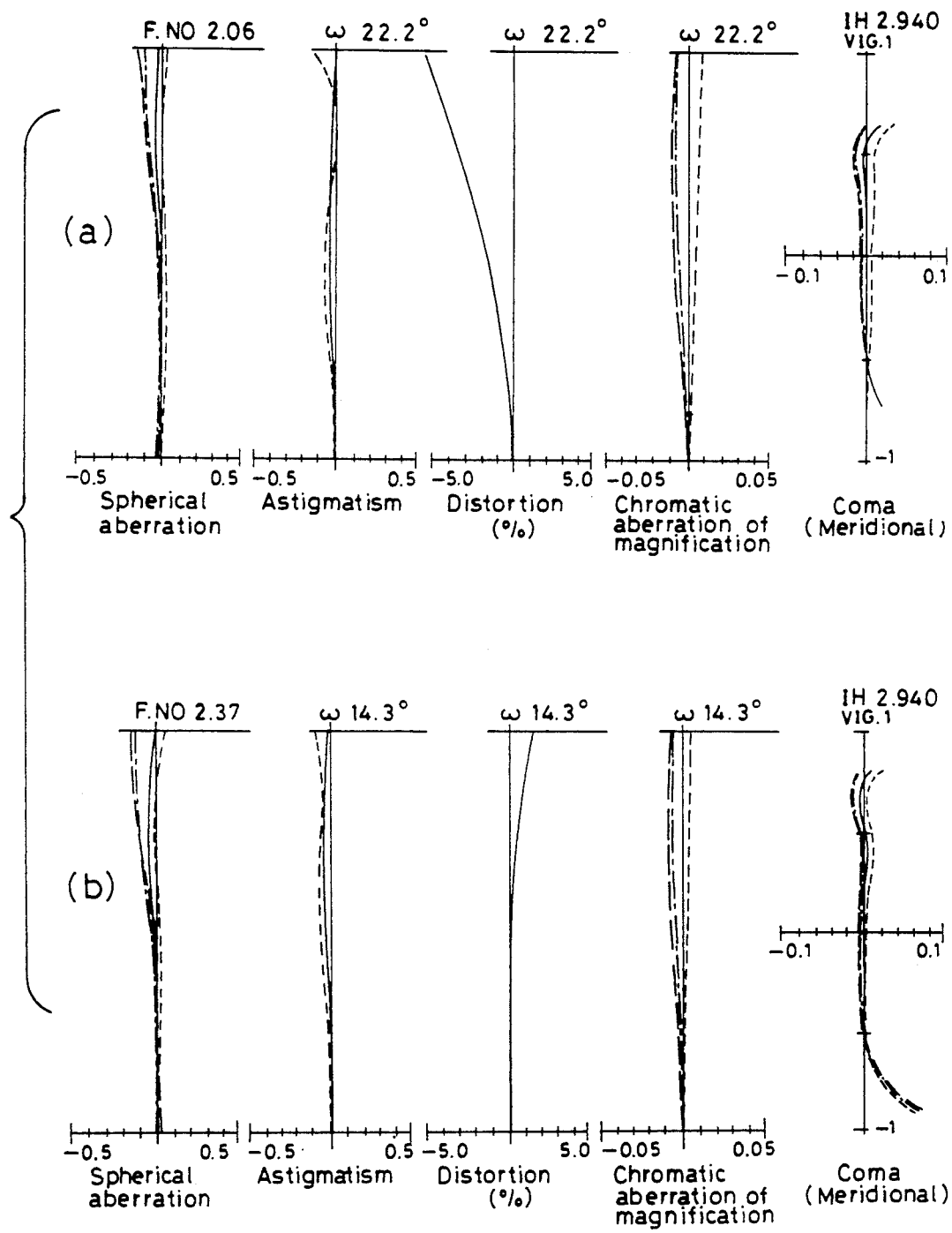
FIG. 11 is aberration diagrams showing the spherical aberration, astigmatism, distortion, chromatic aberration and coma of magnification of Example 6 at the (a) wide angle end (b) standard setting and (c) telephoto end (c) as well as (d) when the image is focused on an object distance $s_1 = -1$ m at the telephoto end.
Figure 11B:
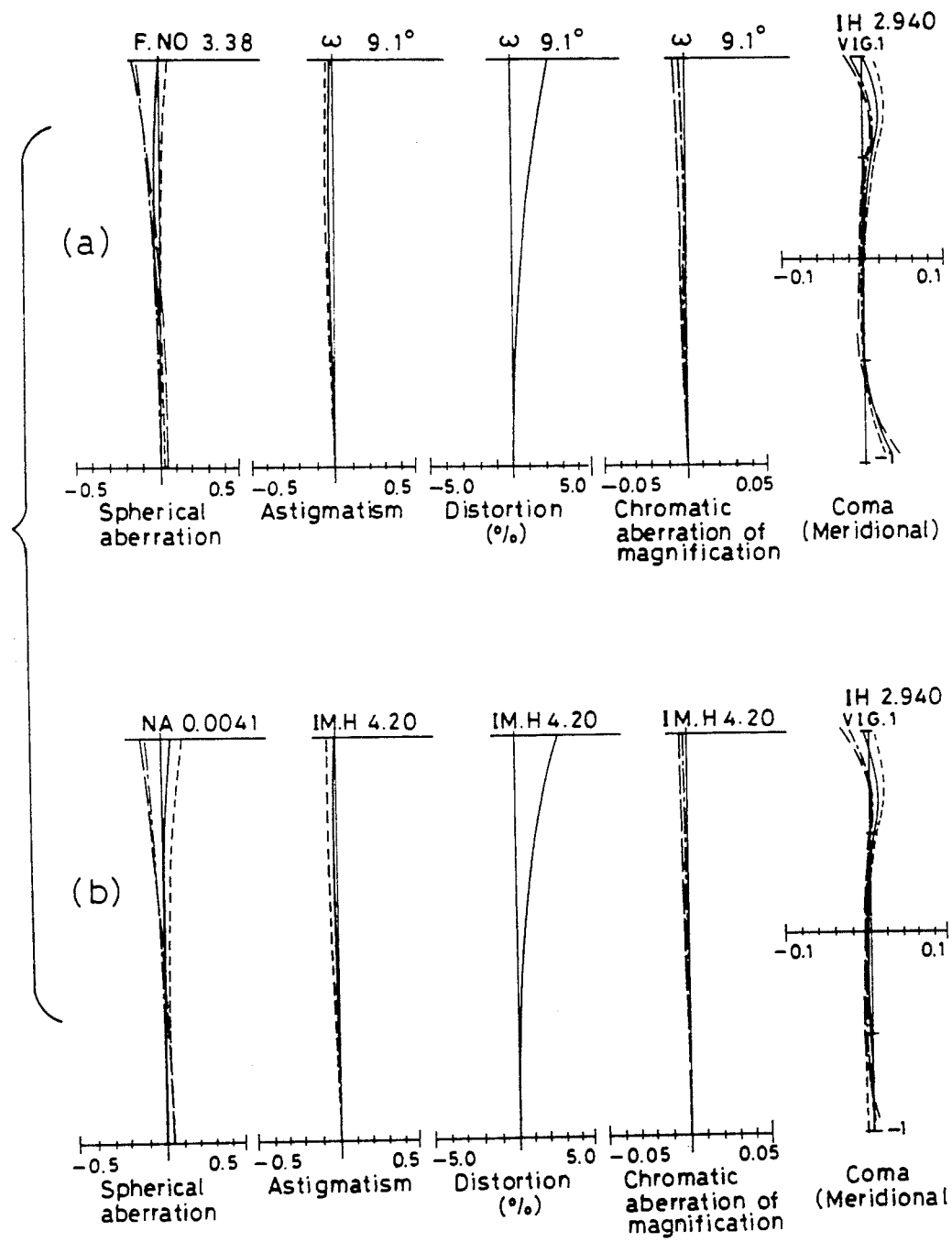
Figure 12A:
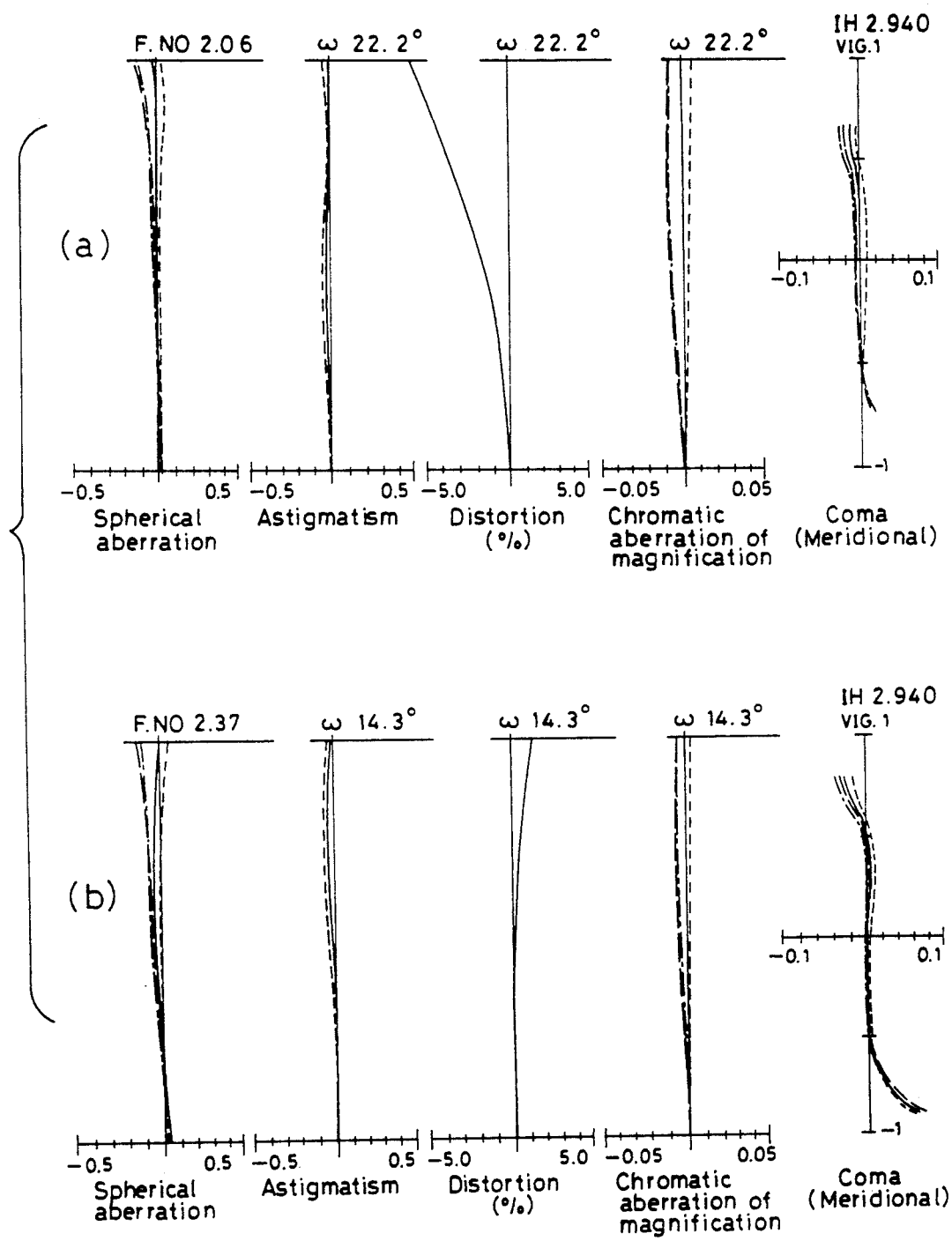
FIG. 12 is aberration diagrams of Example 7 similar to FIG. 11.
Figure 12B:
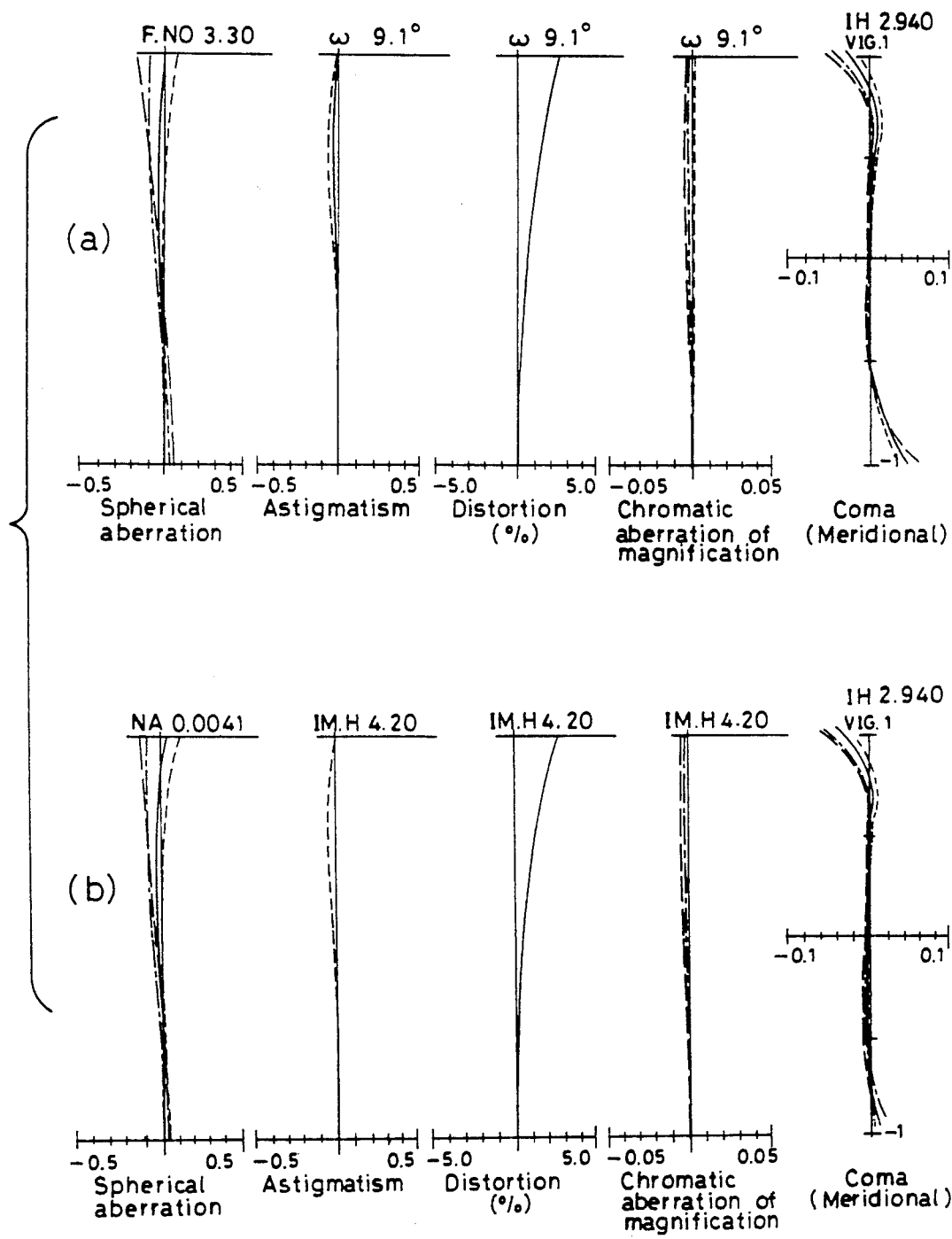

11th surface
$P = 1$
$A_4 = -0.43326 \times 10^{-3}$
$A_6 = -0.18092 \times 10^{-5}$
$A_8 = -0.75075 \times 10^{-7}$ 16th surface
$P = 1$
$A_4 = -0.13721 \times 10^{-3}$
$A_6 = 0.68246 \times 10^{-5}$
$A_8 = -0.60434 \times 10^{-6}$ 17th surface
$P = 1$
$A_4 = -0.11475 \times 10^{-3}$
$A_6 = 0.10479 \times 10^{-4}$
$A_8 = -0.39435 \times 10^{-6}$ $\beta_{3T}/\beta_{3W} = 0.976 \times \beta_{2T}/\beta_{2W}$
$f_3/|f_2| = 1.48$
$(r_{31F} + r_{31R})/(r_{31F} - r_{31R}) = -0.407$
$(r_{32F} + r_{32R})/(r_{32F} - r_{32R}) = 2.790$
$r_{32R}/r_{33F} = 0.210$
$|\Delta_X|/\{(f_W \cdot f_T)^{\frac{1}{2}} F_{NO}^3\} = 2.29 \times 10^{-3}$
$D_{III}/(f_W \cdot f_T)^{\frac{1}{2}} = 0.643$ The spherical aberrations, astigmatisms, distortions and chromatic aberrations of magnification of Examples 1-5 at the (a) wide angle ends, (b) standard settings and (c) telephoto ends are shown in FIGS. 6-10. Further, the spherical aberrations, astigmatisms, distortions, chromatic aberrations and comae (meridional) of Examples 6-7 at the (a) wide angle ends, (b) standard settings and (c) telephoto ends as well as (d) when the images are focused on an object distance $s_1 = -1$ m at the telephoto ends are shown in FIGS. 11-12.

As can be understood from what has been described above, this invention provides a small zoom lens system which has a field angle of about 44° at the wide angle end, a zoom ratio lying in the range of about 2.5-3.2 and an F-number lying in the range of about 2-2.8, comprises 7-8 lenses and has a short total length and a small lens diameter.

The small zoom lens system of this invention lends itself well fit for electronic still cameras or video cameras.

What is claimed is;

1. A zoom lens system comprising, in order from the object side, at least a first lens group having a positive refractive power, a second lens group having a negative refractive power, a stop and a third lens group having a positive refractive power, and in that during zooming the first lens group remains fixed while the second and third lens groups are moved along the optical axis, and the following conditions (1) and (2) are satisfied:

$$0.9 \times \beta_{2T}/\beta_{2W} < \beta_{3T}/\beta_{3W} < 2.0 \times \beta_{2T}/\beta_{2W}, \quad (1)$$

and $$0.5 < f_3/|f_2| < 1.5, \quad (2)$$

where
- $\beta_{2T}$ is the magnification of the second lens group at the telephoto end,
- $\beta_{2W}$ is the magnification of the second lens group at the wide angle end,
- $\beta_{3T}$ is the magnification of the third lens group at the telephoto end,
- $\beta_{3W}$ is the magnification of the third lens group at the wide angle end,
- $f_2$ is the focal length of the second lens group, and
- $f_3$ is the focal length of the third lens group.

2. A zoom lens system comprising, in order from the object side, at least a first lens group having a positive refractive power, a second lens group having a negative refractive power, a stop and a third lens group having a positive refractive power, and in that during zooming the first lens group remains fixed while the second and third lens groups are moved along the optical axis, and the following conditions (3) and (4) are satisfied:

$$-5 < (r_{31F} + r_{31R})/(r_{31F} - r_{31R}) < 1, \quad (3),$$

and $$1.2 < (r_{32F} + r_{32R})/(r_{32F} - r_{32R}) < 4, \quad (4)$$

where
- $r_{31F}$ is the radius of curvature on the object side of the first lens of the third lens group,
- $r_{31R}$ is the radius of curvature on the image side of the first lens of the third lens group,
- $r_{32F}$ is the radius of curvature on the object side of the second lens of the third lens group, and
- $r_{32R}$ is the radius of curvature on the image side of the second lens of the third lens group.

3. A zoom lens system as claimed in claim 1, further including a fourth lens group, which remains fixed during zooming, on the image side of said third lens group.

4. A zoom lens system as claimed in claim 2, further including a fourth lens group, which remains fixed during zooming, on the image side of said third lens group.

5. A zoom lens system as claimed in any one of claims 1-4, wherein said stop remains fixed during 6. A zoom lens system as claimed in any one of claims 1-4, wherein said second lens group and said third lens group are moved on the optical axis in the opposite directions during zooming.

7. A zoom lens system as claimed in any one of claims 1-4, wherein said first lens group and said second lens group comprise one of three and four lenses in all and said third lens group comprises a positive lens, a negative lens and a positive lens, three in all.

8. A zoom lens system as claimed in any one of claims 1-4, wherein the following condition (5) is satisfied:

$$0.2 < r_{32R}/r_{33F} < 1.5, \quad (5)$$

where
- $r_{32R}$ is the radius of curvature on the image side of the second lens of the third lens group, and
- $r_{33F}$ is the radius of curvature on the object side of the third lens of the third lens group.

9. A zoom lens system as claimed in claim 1 or 3, wherein the following condition (3) is satisfied:

$$-5 < (r_{31F} + r_{31R})/(r_{31F} - r_{31R}) < 1, \quad (3)$$

where
- $r_{31F}$ is the radius of curvature on the object side of the first lens of the third lens group, and
- $r_{31R}$ is the radius of curvature on the image side of the first lens of the third lens group, 10. A zoom lens system as claimed in any one of claims 1-4, wherein the surface of the first lens of said third lens group proximate to the object side includes an aspherical surface and the following condition (6) is satisfied:

$$0.5 \times 10^{-3} < |\Delta x|/\{(f_W \cdot f_T)^{\frac{1}{2}} F_{NO}^3\} < 0.8 \times 10^{-2} (\Delta x < 0), \quad (6)$$

where
- $f_W$ is the focal length of the total system at the wide angle end,
- $f_T$ is the focal length of the total system at the telephoto end,
- $\Delta x$ is the axial displacement of the aspherical surface with respect to the spherical surface with the focal length being identical with that of the first lens of the third lens group, and
- $F_{NO}$ is the smallest F-number of the total system at the wide angle end.

11. A zoom lens system as claimed in any one of claims 1-4, further satisfying the following condition (7):

$$0.3 < D_{III}/(f_W \cdot f_T)^{\frac{1}{2}} < 0.8 \quad (7)$$

where
- $f_W$ is the focal length of the total system at the wide angle end,
- $f_T$ is the focal length of the total system at the telephoto end, and
- $D_{III}$ is the distance from the vertex of the surface of the third lens group proximate to the object side to the vertex of the surface thereof proximate to the image side.

12. A zoom lens system as claimed in claim 11, characterized in that the first lens of said first lens group comprises a negative meniscus lens convex on the object side and said third lens group includes on the image side a fourth lens group having a decreased refractive power.

13. A zoom lens system comprising, in order from the object side, at least a first lens group having a positive refractive power, a second lens group having negative refractive power, a stop and a third lens group having a positive refractive power, said first lens group and said second lens group comprising one of three and four lenses in all and said third lens group comprising a first positive lens, a second negative meniscus lens and a third positive lens, and in that during zooming the first lens group remains fixed while the second and third lens groups are moved along the optical axis.

* * * * *